United States Patent
Fuchs et al.

(10) Patent No.: US 7,182,465 B2
(45) Date of Patent: Feb. 27, 2007

(54) METHODS, SYSTEMS, AND COMPUTER PROGRAM PRODUCTS FOR IMPERCEPTIBLY EMBEDDING STRUCTURED LIGHT PATTERNS IN PROJECTED COLOR IMAGES FOR DISPLAY ON PLANAR AND NON-PLANAR SURFACES

(75) Inventors: Henry Fuchs, Chapel Hill, NC (US); Daniel Cotting, Zurich (CH); Martin Naef, Glasgow (GB); Markus Gross, Zurich (CH)

(73) Assignee: The University of North Carolina, Chapel Hill, NC (US)

( * ) Notice: Subject to any disclaimer, the term of this patent is extended or adjusted under 35 U.S.C. 154(b) by 9 days.

(21) Appl. No.: 11/066,629

(22) Filed: Feb. 25, 2005

(65) Prior Publication Data

US 2005/0254726 A1 Nov. 17, 2005

Related U.S. Application Data

(60) Provisional application No. 60/547,724, filed on Feb. 25, 2004.

(51) Int. Cl.
*G03B 21/14* (2006.01)
*G01B 11/25* (2006.01)

(52) U.S. Cl. .................. 353/69; 353/28; 353/121; 356/604

(58) Field of Classification Search ............... 353/121, 353/122, 69, 70, 94, 7, 11, 28, 71; 348/14.03, 348/14.07, 14.16, 121, 169, 745–747; 356/601, 356/610, 602–604; *G03B 21/14*; *G01B 11/25*
See application file for complete search history.

(56) References Cited

U.S. PATENT DOCUMENTS 5,109,276 A    4/1992  Nudelman et al.

(Continued)

FOREIGN PATENT DOCUMENTS

FR          2 794 246        12/2000

(Continued)

OTHER PUBLICATIONS

International Search Report in PCT Application No. PCT/US03/17987 (Mar. 22, 2004).

(Continued)

*Primary Examiner*—W. B. Perkey
*Assistant Examiner*—Andrew Sever
(74) *Attorney, Agent, or Firm*—Jenkins, Wilson, Taylor & Hunt, P.A.

(57) ABSTRACT

Methods, systems, and computer program products for imperceptibly embedding structured light patterns in projected color images for display on planar and non-planar surfaces are disclosed. According to one method, an image exposure period for detecting an embedded structured light patterns in a projected image is selected based on analysis of pixel polarities for different pixel intensities of a pixel color. Pixel intensities for the color are varied in the user image so that pixel polarities encode the structured light patterns during image exposure period. The user image is projected with the structured light patterns onto the surface. Depth information is continuously acquired and used to adjust display of the user image.

52 Claims, 20 Drawing Sheets

U.S. PATENT DOCUMENTS

| | | | |
|---|---|---|---|
| 5,193,120 A | 3/1993 | Gamache et al. | |
| 5,307,153 A | 4/1994 | Maruyama et al. | |
| 5,323,002 A | 6/1994 | Sampsell et al. | |
| 5,371,543 A | 12/1994 | Anderson | |
| 5,446,798 A | 8/1995 | Morita et al. | |
| 5,452,024 A | 9/1995 | Sampsell | |
| 5,457,493 A | 10/1995 | Leddy et al. | |
| 5,488,431 A | 1/1996 | Gove et al. | |
| 5,489,952 A | 2/1996 | Gove et al. | |
| 5,491,510 A | 2/1996 | Gove | |
| 5,526,051 A | 6/1996 | Gove et al. | |
| 5,532,997 A | 7/1996 | Pauli | |
| 5,541,723 A | 7/1996 | Tanaka | |
| 5,570,135 A | 10/1996 | Gove et al. | |
| 5,608,468 A | 3/1997 | Gove et al. | |
| 5,612,753 A | 3/1997 | Poradish et al. | |
| 5,629,794 A | 5/1997 | Magel et al. | |
| 5,630,027 A | 5/1997 | Venkateswar et al. | |
| 5,699,444 A | 12/1997 | Palm | |
| 5,784,098 A | 7/1998 | Shoji et al. | |
| 5,870,136 A | 2/1999 | Fuchs et al. | |
| 6,341,016 B1* | 1/2002 | Malione | 356/603 |
| 6,503,195 B1 | 1/2003 | Keller et al. | |
| 6,554,434 B2* | 4/2003 | Sciammarella et al. | 353/98 |
| 2002/0057832 A1 | 5/2002 | Proesmans et al. | |
| 2003/0223083 A1 | 12/2003 | Geng | |
| 2004/0033060 A1* | 2/2004 | Beaton | 386/117 |
| 2004/0184013 A1* | 9/2004 | Raskar et al. | 353/121 |
| 2004/0257540 A1* | 12/2004 | Roy et al. | 353/69 |

FOREIGN PATENT DOCUMENTS

| | | |
|---|---|---|
| WO | WO 03/105289 A2 | 12/2003 |

OTHER PUBLICATIONS

Majumder et al., "Color Nonuniformity in Projection-Based Displays: Analysis and Solutions," IEEE Transactions on Visualization and Computer Graphics, vol. 10, No. 2, pp. 177-188 (Mar./Apr. 2004).
Gross et al.,. "blue-c: A Spatially Immersive Display and 3D Video Portal for Telepresence," Siggraph 2003 Conference Proceedings, ACM Siggraph Annual Conference Series, (2003).
Koninckx et al., "Real-Time Range Scanning of Deformable Surfaces by Adaptively Coded Structured Light," Fourth International Conference on 3-D Digital Imaging and Modeling (2003).
Raskar et al., "iLamps: Geometrically Aware and Self-Configuring Projectors," Siggraph 2003 Conference Proceedings, ACM Siggraph Annual Conference Series, pp. 1-10 (2003).
Zhang et al., "Spacetime Stereo: Shape Recovery for Dynamic Scenes," CVPR 2003 Conference Proceedings, CVPR Conference Series, pp. 1-8 (2003).
Li et al., "Combining Stereo and Visual Hull Information for On-Line Reconstruction and Rendering of Dynamic Scenes," pp. 1-4 (2002).
Rusinkiewicz et al., "Real-Time 3D Model Acquisition," Siggraph 2002 Conference Proceedings, ACM Siggraph Annual Conference Series, pp. 1-9 (2002).
Zhang et al., "Rapid Shape Acquisition Using Color Structured Light and Multi-Pass Dynamic Programming," Proc. Symposium on 3D Data Processing Visualization and Transmission (3DPVT), pp. 1-13 (2002).
Sadagic et al., "National Tele-Immersion Initiative: Towards Compelling Tele-Immersive Collaborative Environments" presentation given at Medicine meets Virtual Reality 2001 Conference, (2001).
Mulligan et al., "View-Independent Scene Acquisition for Tele-Presence," Proceedings of the International Symposium on Augmented Reality, pgs. 1-10 (Oct. 2000).
Matusik et al., "Image-Based Visual Hulls," Proceedings of Siggraph 2000, pp. 1-6 (2000).
Perlin et al., "An Autostereoscopic Display," Proceedings of ACM Siggraph 2000, Computer Graphics Proceedings, Annual Conference Series, pp. 1-8 (2000).
Gibbs et al., "Teleport - Towards Immersive Copresence," Multimedia Systems 7, pp. 214-221 (1999).
Advertisement, "Virtual 3D High Speed Non-Contact Surface Perception," Virtual 3-D Technologies Corporation, www.virtual3dtech.com, (Dec. 21, 1998).
Advertisement, "Virtuoso," Visual Interface, Inc., www.visint.com (Dec. 21, 1998).
Fuchs et al., "Augmented Reality Visualization for Laparoscopic Surgery," MICCAI, vol. 11, No. 13, pp. 934-943, (Oct. 1998).
Advertisement, "Inspeck 3DC 3D Capturor," www.inspeck.com (1998).
Advertisement, "Virtuoso," Visual Interface, Inc. (1998).
Raskar et al., "The Office of the Future: A Unified Approach to Image-Based Modeling and Spatially Immersive Displays," Proceedings of Siggraph 98, pp. 1-10 (Jul. 1998).
Livingston et al., "Magnetic Tracker Calibration for Improved Augmented Reality Registration," Presence: Teleoperators and Virtual Environments, MIT Press, vol. 6, No. 5, pp. 532-546, (Oct. 21, 1997).
Jacobs et al., "Managing Latency in Complex Augmented Reality Systems," Proceedings of 1997 Symposium on Interactive 3D Graphics, Annual Conference Series, ACM Siggraph, pp. 49-54 (Apr. 27, 1997).
Agrawala et al., "The Two-User Responsive Workbench: Support for Collaboration Through Independent Views of a Shared Space," Proceedings of Siggraph 97, Computer Graphics Proceedings, Annual Conference Series, pp. 327-332 (1997).
Welch et al., "Scaat: Incremental Tracking with Incomplete Information," Computer Graphics 31, Annual Conference Series, pp. 1-12 (1997).
Zitnick et al., "Multi-Baseline Stereo Using Surface Extraction," Visual Interface Inc. (Nov. 24, 1996).
Garrett et al., "Real-Time Incremental Visualization of Dynamic Ultrasound Volumes Using Parallel BSP Trees," Proceedings of IEEE Visualization of Dynamic Ultrasound Volumes Using Parallel BSP Trees, pp. 235-240 (Oct. 27, 1996).
Fuchs et al. "Towards Performing Ultrasound-Guided Needle Biopsies from Within a Head-Mounted Display", 4th International Conference, VBC '96 (Sep. 22-25, 1996).
State et al., "Superior Augmented Reality Registration by Integrating Landmark Tracking and Magnetic Tracking," Computer Graphics Proceedings, Proceedings of Siggraph 96 - Annual Conference Series, pp. 429-438 (Aug. 4, 1996).
State et al., "Technologies for Augmented Reality Systems," Computer Graphics Proceedings, Proceedings of Siggraph 96, Annual Conference Series, pp. 439-446 (Aug. 4, 1996).
Depiero et al., "3-D Computer Vision Using Structured Light: Design, Calibration and Implementation Issues," The University of Tennessee, pp. 1-46 (1996).
Laurentini, "The Visual Hull Concept for Silhouette-Based Image Understanding," IEEE Transactions on Pattern Analysis and Machine Intelligence, vol. 16, No. 2, pp. 150-162 (Feb. 1994).
State et al., "Case Study: Observing a Volume Rendered Fetus within a Pregnant Patient," IEEE Visualization Conference, 5th ed., p. 364-368 (1994).
Cruz-Neira et al., "Surround-Screen Projection-Based Virtual Reality: The Design and Implementation of the Cave," Proceedings of Siggraph 93, pp. 135-142 (Aug. 1993).
Ohbuchi "Incremental Acquisition and Visualization of 3D Ultrasound Images", Ph.D. Dissertation, UNC-CH Computer Science Technical Report TR95-023 (1993).
Ohbuchi et al., "Incremental Volume Reconstruction and Rendering for 3D Ultrasound Imaging," Visualization in Biomedical Computing, SPIE Proceedings, pp. 312-323 (Oct. 13, 1992).
Bajura et al., "Merging Virtual Objects with the Real World: Seeing Ulrasound Imagery within the Patient," Proceedings of Siggraph 92, vol. 2, No. 26, pp. 203-210 (Jul. 20, 1992).
Ohbuchi et al. "Incremental Volume Rendering Algorithm for Interactive 3D Ultrasound Imaging", UNC-CH Computer Science Technical Report TR91-023 (1991).

Bitner et al., "Efficient Generation of the Binary Reflected Gray Code and Its Applications," Communications of the ACM, vol. 19, No. 9, pp. 517-521 (1976).

Baumgart, "Winged Edge Polyhedron Representation," Advanced Research Projects Agency, Computer Science Department, Stanford University, 48 pgs. (1972).

Notification of Transmittal of the International Search Report and the Written Opinion of the International Searching Authority, or the Declaration in PCT Application No. PCT/US05/06225 (Aug. 2, 2006).

* cited by examiner

METHODS, SYSTEMS, AND COMPUTER PROGRAM PRODUCTS FOR IMPERCEPTIBLY EMBEDDING STRUCTURED LIGHT PATTERNS IN PROJECTED COLOR IMAGES FOR DISPLAY ON PLANAR AND NON-PLANAR SURFACES

RELATED APPLICATIONS

This application claims the benefit of U.S. Provisional Patent Application Ser. No. 60/547,724, filed Feb. 25, 2004; the disclosure of which is incorporated herein by reference in its entirety.

GOVERNMENT INTEREST

This invention was made with U.S. Government support under grant number N00014-03-1-0589 awarded by the Defense Advanced Research Projects Agency (DARPA) through the Office of Naval Research (ONR) and undergrant number IIS-0121293 awarded by the National Science Foundation (NSF). The U.S. Government has certain rights in the invention.

TECHNICAL FIELD

The subject matter described herein relates to embedding structured light patterns in projected images, such as color images. More particularly, the subject matter described herein relates to methods, systems, and computer program products for imperceptibly embedding structured light patterns in projected color images for display on planar and non-planar surfaces.

BACKGROUND ART

In computer display systems, it may be desirable to project images that will be viewed by a user onto arbitrary surfaces. For example, in flight simulators, it may be desirable to project computer-generated images of scenes that would be viewed by a pilot onto a display screen. The display screen on which the images are projected may have a conical shape to simulate the cockpit of an aircraft and so that the user will be immersed in the flight simulation environment. In order to correctly display each pixel in the projected image, the projector must be calibrated according to the depth of each point on the display screen so that a two-dimensional source image can be pre-distorted for undistorted display on the three-dimensional display screen. Requiring that the projector be specially calibrated to a particular display screen makes the projector and the flight simulation program unsuitable for use in arbitrary environments. For example, it may be desirable to conduct a flight simulation in an arbitrary location, such as an office in which the walls form a parallelepiped structure. However, because immersive flight simulators are calibrated to their particular display screens, such simulators are unsuitable for use in different environments. Accordingly, portable flight simulators are limited to display on standard two-dimensional LCD or CRT display screens, which greatly decreases their utility in training pilots.

Another example for which it may be desirable to display projected images on arbitrary surfaces occurs in standard office environments. In this example, a user may desire to project the user interface associated with a computer program, such as an email program, on a wall of the user's office. If the wall forms a planar surface, a standard projector can be used, and distortion in the projected image should be minimal. However, if the user desires that the display span more than one wall, a portion of a wall and the ceiling or the floor, or any other non-planar surface, portions of the image may be distorted due to the points on which individual pixels are displayed being located at different distances from the projector. Accordingly, the user or the projector manufacturer will be required to alter the projector and/or the display software to accommodate the different surfaces. Requiring projector customization for each display surface is impractical and undesirable in light of the number of potential variations in display surfaces.

In light of the problems associated with displaying images on non-planar surfaces, it may be desirable to acquire depth information regarding the surfaces and to pre-distort the images for undistorted display on the non-planar surfaces. One method that has been used to obtain depth information is referred to as structured light depth extraction. In structured light depth extraction, a projector projects patterns of stripes or other images onto a surface. A camera detects the patterns as they are reflected from the surface. Depth extraction software is programmed with the location of the projector and the camera and computes the depth of each point in the image based on translations in locations of pixels from the projected image to the reflected image. Thus, structured light depth extraction can be used to detect the geometry of a display surface and the depth information can be used to pre-distort the image so that the displayed image will appear undistorted on non-planar surfaces. However, one problem with using structured light in combination with projected user images is that the structured light patterns are not visually pleasing to users. For example, a user who wants to view a projection of his or her email interface on one or more walls of the user's office will not want the email interface to be projected simultaneously with a visible striped pattern, as the pattern would impair viewing of the email interface.

In light of the competing goals of obtaining depth information and providing an environment that is visually pleasing to the user, structured light patterns have been generated using non-visible wavelengths of light. In one method, infrared light is used to project structured light patterns. For example, an infrared projector may be used to project structured light patterns onto an object being imaged. The infrared images may be collected and used to compute depth information for the object. A depth-corrected image of the object may then be displayed to the user. Because the infrared patterns are outside of the visible light wavelength, the end user does not perceive the patterns. However, one problem with using infrared structured light patterns is that an infrared projector is required. Infrared projectors are more expensive than visible light projectors and are not universally available. In systems where it is desirable to project a user image simultaneously with the projection of infrared structured light patterns, two projectors would be required—an infrared projector for the structured light patterns and a visible light projector for the user image. Requiring two projectors further increases the expense and decreases the reliability of the display system. Another problem with using infrared projectors is that current infrared projectors are not capable of projecting dynamically changing patterns at speeds that are sufficiently fast for simultaneous depth extraction and display.

Thus, in light of the difficulties associated with conventional projection display and structured light depth extraction systems, there exists a need for improved methods, systems, and computer program products for imperceptibly

SUMMARY

The subject matter described herein relates to methods, systems, and computer program products for imperceptibly embedding structured light patterns in projected color images for display on planar and non-planar surfaces. As used herein, the term "structured light pattern" includes any spatially varying pattern of light that includes the simultaneous projection of a plurality of pixels. One example of a structured light pattern is a set of alternating dark and light stripes. The terms "imperceptible structured light pattern" or "imperceptibly embedded structured light pattern" refer to a pattern that is not detectable by or that is at least partially hidden from one detector, such as a human eye, but that is detectable by another detector, such as a camera synchronized to the projection of the structured light pattern. The term "color image," as used herein, refers to an image having a color other than black and white.

According to one aspect, the subject matter described herein includes a method for imperceptibly embedding structured light patterns in projected color images and for adapting the images for display on arbitrary surfaces. The method includes selecting an image exposure period for detecting embedded structured light patterns in a projected image. The image exposure period may be selected based on analysis of projector pixel polarities for different pixel intensities of a pixel color. In one example, the image exposure period is selected to be a time period during which pixels of a display are reliably on or off for a range of intensity values for a given color. Another criterion for selecting the image exposure period may be that the pixel polarities vary for different intensities of the color during the exposure period. For example, if a pixel is always off or always on for all intensities during an exposure period, the pixel polarity may be unsuitable for encoding binary images as the exposure period would only be capable of encoding one value, i.e., on or off.

Once the image exposure period is selected, pixel intensity values may be varied for a given color in a user image so that pixel polarities will encode the structured light pattern during the image exposure period. In one exemplary implementation, the pixel intensity of a particular color is varied to the nearest intensity value to the original intensity value that corresponds to a polarity that encodes the desired value during the image exposure period. Each pixel in the structured light pattern is embedded in this manner. Once the structured light pattern is embedded in the user image, the combined image may be projected onto an arbitrary surface. Depth information may be continuously calculated from the structured light pattern. The depth information may be used to continuously adjust the displayed image so that the image appears undistorted, even when projected onto non-planar surfaces.

The subject matter described herein may be implemented using any combination of hardware, software, or firmware for imperceptibly embedding structured light patterns in user images for display on planar and non-planar surfaces. In one implementation, the subject matter described herein may be implemented using a computer program product comprising computer executable instructions embodied in a computer readable medium. Exemplary computer readable media suitable for implementing the subject matter described herein includes application specific integrated circuits, programmable logic devices, chip memory devices, disk memory devices, and downloadable electrical signals.

BRIEF DESCRIPTION OF THE DRAWINGS

Preferred embodiments of the subject matter described herein will now be explained with reference to the accompanying drawings of which.

DETAILED DESCRIPTION

Figure 1:
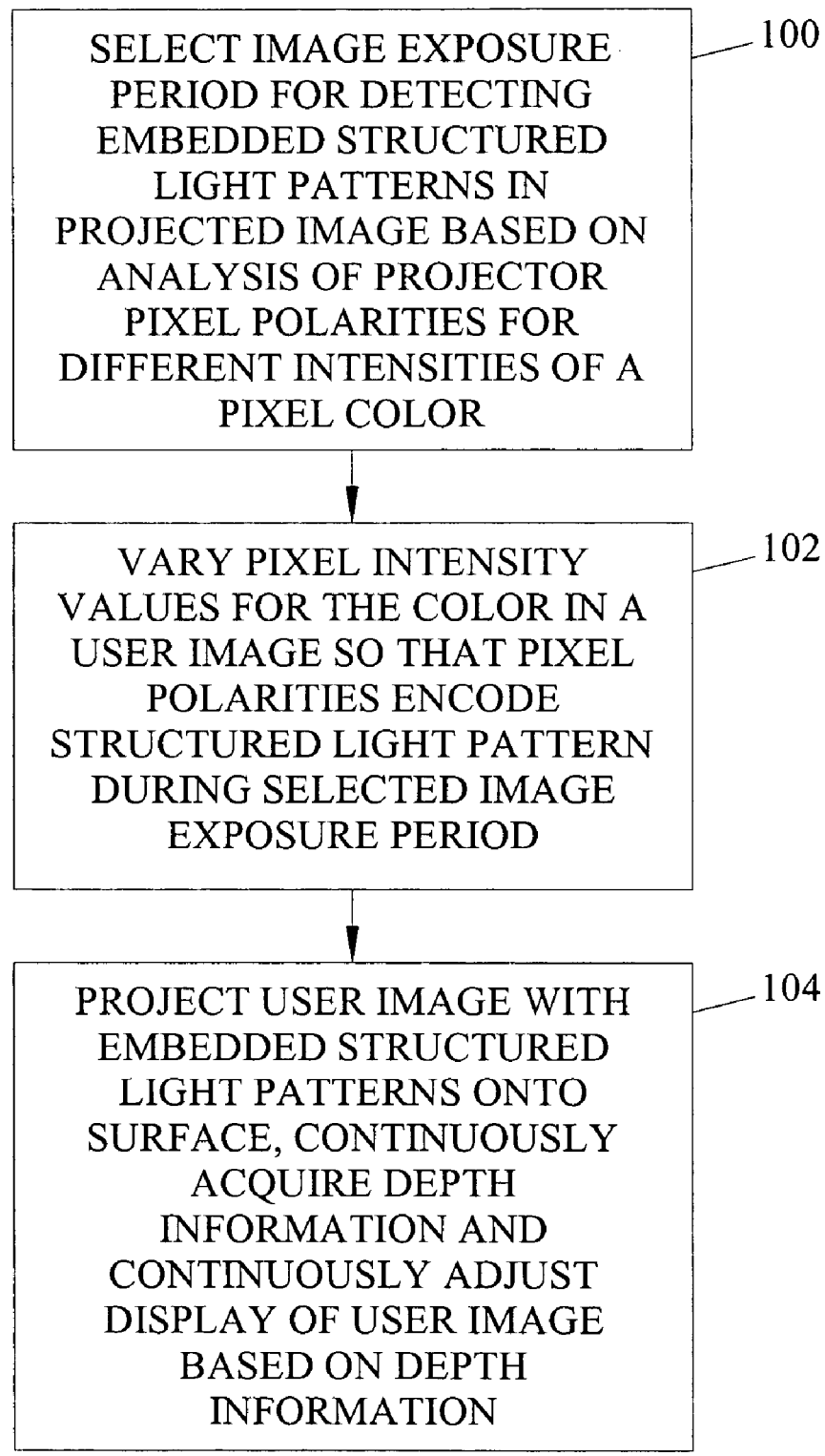
FIG. 1 is a flow chart illustrating exemplary overall steps for imperceptibly embedding structured light patterns in color images and for projecting the color images onto arbitrary surfaces according to an embodiment of the subject matter described herein.

As described above, the subject matter described herein includes methods, systems, and computer program products for imperceptibly embedding structured light patterns in projected color images for display on planar and non-planar surfaces. FIG. 1 is a flow chart illustrating exemplary overall steps for embedding structured light patterns in a projected color image and for displaying the image on a surface using depth information obtained from the projection of the structured light patterns. Referring to FIG. 1, in step 100, an image exposure period is selected for detecting embedded structured light patterns in projected images based on analysis of projector pixel polarities for different pixel intensities of a pixel color. The image exposure period is the time during the display of each frame of a projected image that a camera will acquire the structured light pattern. The time is preferably selected such that a structured light pattern can be embedded in a user image without perceptibly changing the image from the user's point of view. This time may be determined based on analysis of pixel polarities, i.e., whether a pixel is on or off for different pixel intensities of a pixel color. An exemplary method for analyzing pixel polarities for a pixel color and selecting an image exposure period for a particular digital light processing (DLP) projector will be described in detail below.

Once the image exposure period is selected, in step 102, pixel intensity values are varied for the selected color so that pixel polarities will encode the structured light pattern during the image exposure period. Each pixel intensity value is preferably selected to be the closest value to the original intensity value that will encode the pixel value in the structured light pattern. For example, if a pixel in a user image is supposed to have a red component with an intensity of 128 on a scale of 0–256, that pixel may be on or off during the image exposure period. In the present example, it is assumed that the pixel is on and that it is desirable to embed a dark pixel from the structured light pattern during the image exposure period. In order to encode the dark pixel, the pixel intensity value for the user image pixel may be changed from 128 to the next closest intensity value from the point of view of the user for which the given pixel is off during the image exposure period. Step 102 is preferably performed for each pixel in the structured light pattern so that the entire structured light pattern is encoded and detectable during the image exposure period.

In step 104, the user image with the embedded structured light pattern is projected onto a surface. A camera or other suitable detector continuously acquires the reflected structured light pattern. Depth information of the surface is extracted. The projected display of the user image is adjusted based on the depth information. The acquisition of depth information and the adjustment of the display of the user image may be performed continuously so that changes in the surface or the scene geometry will not adversely affect quality of the displayed user image.

Figure 2:
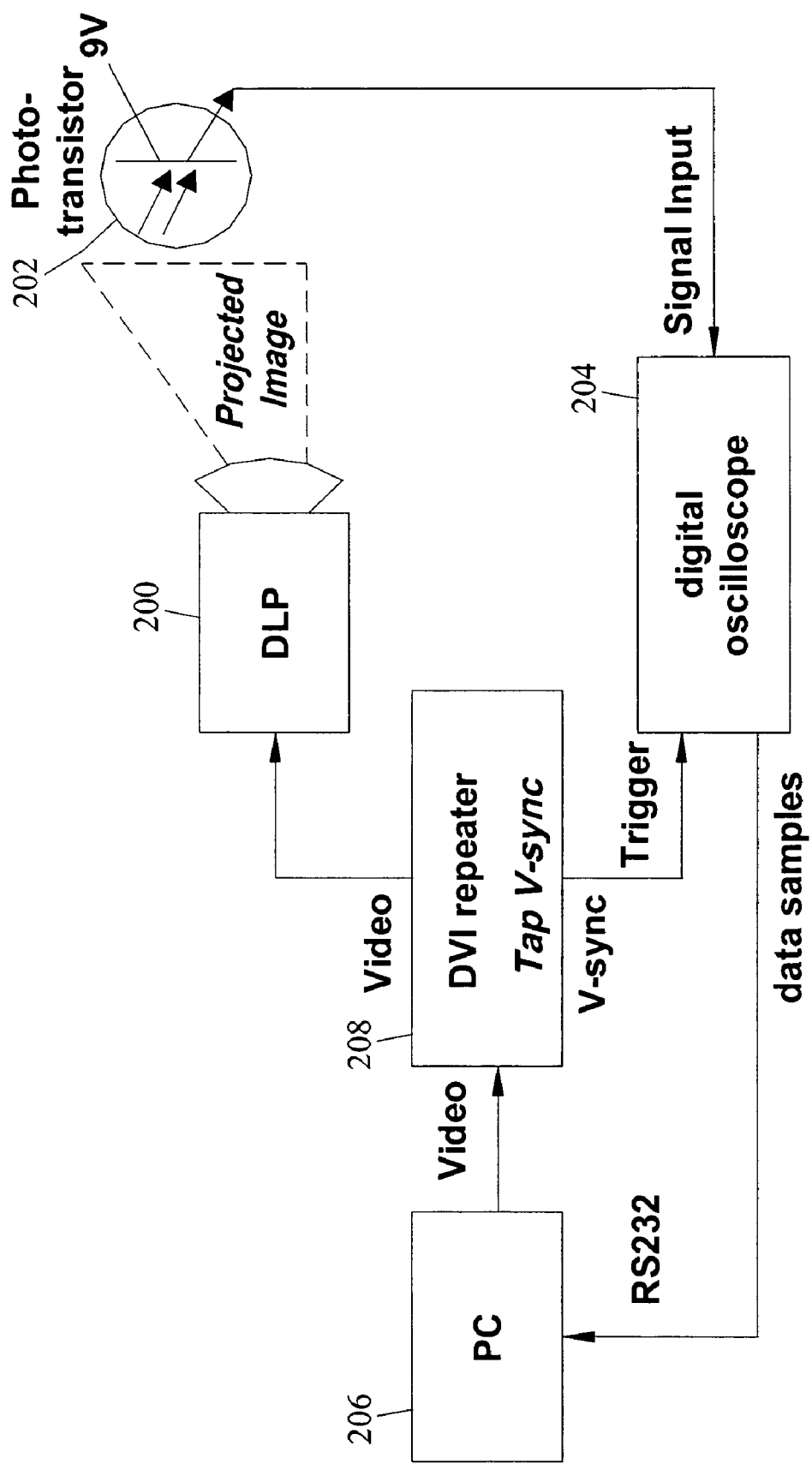
FIG. 2 is a block diagram illustrating an exemplary system for measuring a projector mirror flip sequence according to an embodiment of the subject matter described herein.

As described in step 100, the image exposure period is preferably selected based on projector pixel polarities for different pixel intensities of a pixel color. The step of selecting the image exposure period may be performed at manufacturing time during design of the hardware or software controller to be used with the particular projector or at upfitting time where a projector re-seller or software manufacturer creates projector software to imperceptibly embed structured light patterns. FIG. 2 is a block diagram illustrating an exemplary system for selecting an image exposure period for detecting embedded structured light patterns. Referring to FIG. 2, the system includes a digital light processing projector 200 that projects images onto surfaces. A phototransistor 202 measures pixel intensity values in the projected image. A digital oscilloscope 204 receives the signal output from phototransistor 202 corresponding to each projected image. A computer 206 generates images of different colors and different intensities of each color so that projector pixel polarities can be analyzed. A repeater 208 provides the video signal to projector 200 and a trigger signal to digital oscilloscope 204 to trigger sampling of the signal output from phototransistor 202. Digital oscilloscope 204 provides data samples to computer 206 so that an optimal image exposure period can be determined.

Figure 3:
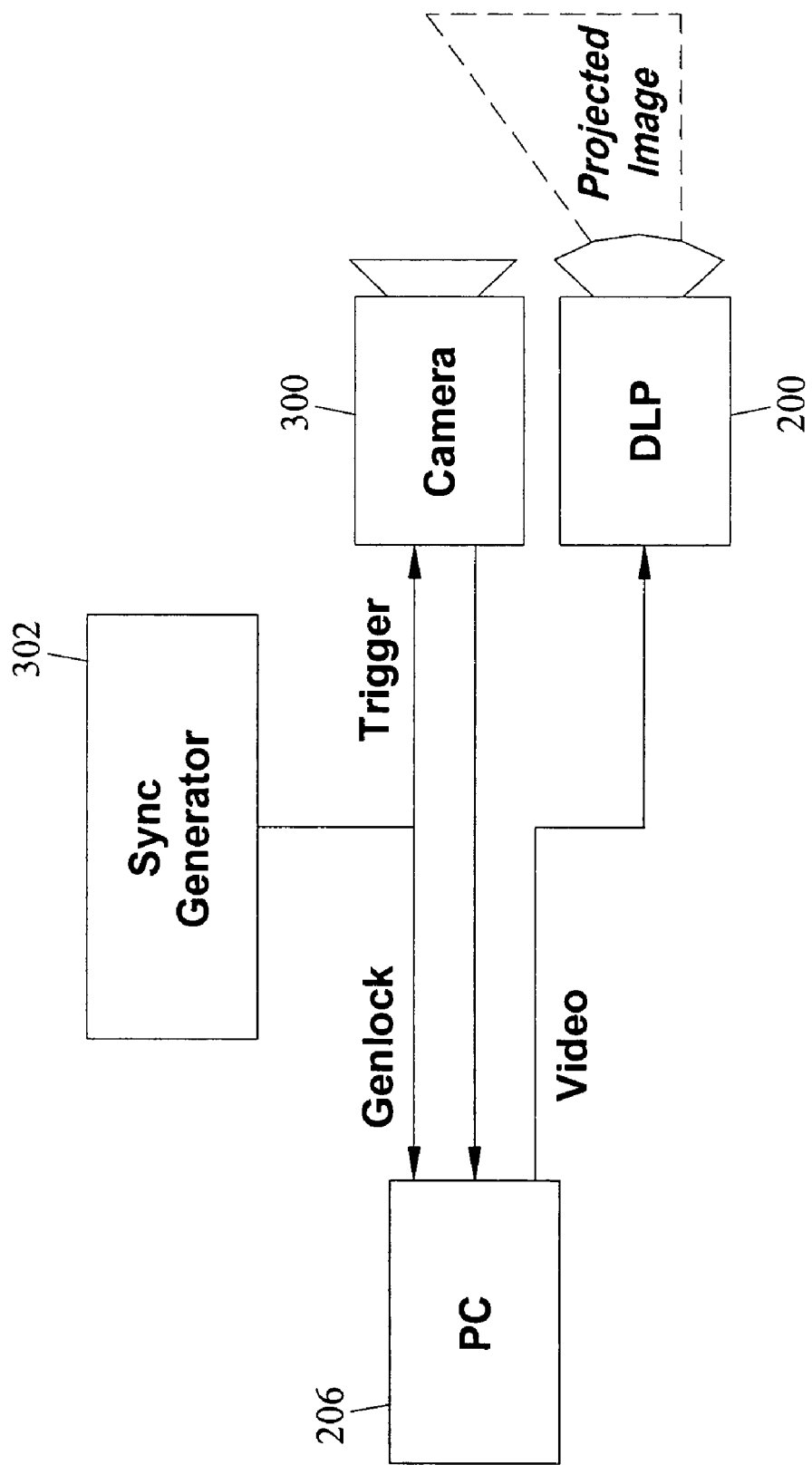
FIG. 3 is a block diagram illustrating an alternate system for measuring a projector mirror flip sequence according to an embodiment of the subject matter described herein.

Although the system illustrated in FIG. 2 utilizes a phototransistor and a digital oscilloscope and is capable of accurately analyzing projector pixel polarities, it may be desirable to analyze projector pixel polarities using simpler, more universally available components. FIG. 3 is a block diagram illustrating an alternate system for analyzing projector pixel polarities according to an embodiment of the subject matter described herein. In FIG. 3, rather than using a phototransistor, a digital camera 300 is utilized to sample output from projector 200 at different time intervals for different intensities so that the image exposure period can be determined. In addition, a digital oscilloscope is not required. Instead, a sync generator 302 synchronizes exposure of camera 300 with projection of patterns by projector 200. The operation of the system illustrated in FIG. 3 is otherwise the same as that illustrated in FIG. 2.

In one exemplary digital light processing projector, each projected image is generated by reflecting light from a white light source onto an array of micromirrors. If a mirror is tilted towards the display surface at a particular instance in time, the corresponding pixel will be on. If a mirror is tilted away from the display surface at a particular instance in time, the pixel will be off. Accordingly, it is desirable to determine the mirror flip sequences for different colors in order to select an ideal image exposure period during which pixel intensity values can be changed to encode the structured light pattern with minimal change in the user image.

Figure 4:
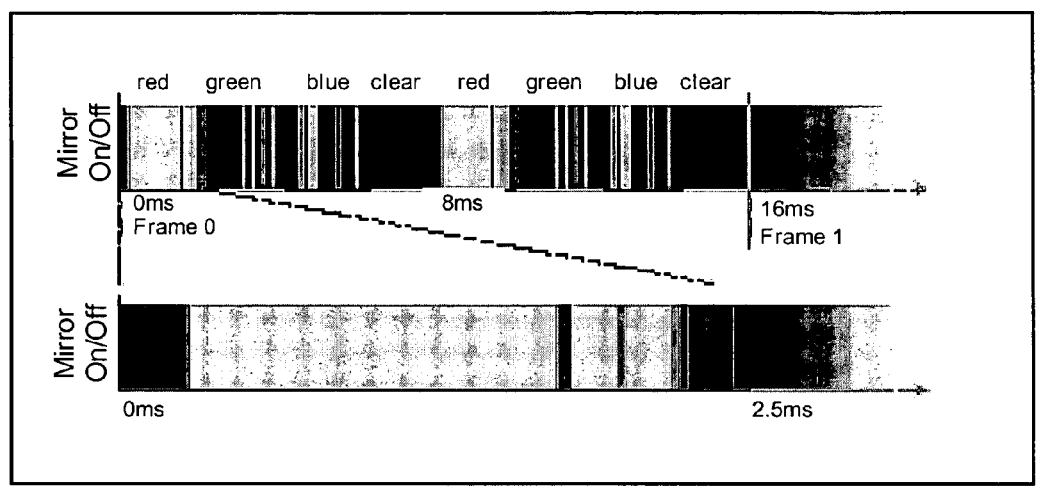
FIG. 4 is a diagram illustrating an exemplary mirror flip sequence for a combination of red, green, and blue values of a pixel during a frame.

In a color projector with independent red, green, and blue channels, each pixel in a user image has intensity values for red, green, and blue components. The intensity values for each component are produced by turning mirrors on or off (i.e., towards or away from the display surface) many times during each frame. FIG. 4 illustrates an exemplary mirror flip sequence for one particular red, green, blue (RGB) value (223, 47, 128). The horizontal axis in FIG. 4 represents time. The dark regions represent periods when the mirror is off, the white regions represent periods where the mirror is on, and the dark gray regions represent periods when the mirror is not reliably on or off. The text above the uppermost mirror flip sequence in FIG. 4 represents the color being generated, as determined by a color filter placed in front of the mirror. From FIG. 4 it can be seen that for pixel intensity level 223 (red), the mirror is on for most of the time. For level 47 (green), the mirror is off for most of the time. For level 128 (blue), the pixel is on for about 35% of the time. The data in FIG. 4 illustrates that the projector's output response is not a linear function of the input intensities. In addition to the red, green, and blue periods, a fourth period appears at the end of each red, green, and blue sequence during which the mirror is off. This fourth period is referred to as a clear period because no color filter is placed in front of the mirror. This clear period is designed to boost light output at the expense of color purity. The color pattern of red, green, and blue in FIG. 4 repeats twice for each 16 ms or 60 Hz frame. Thus, the particular projector being analyzed has a mirror flip sequence corresponding to each pixel color.

Figure 5:
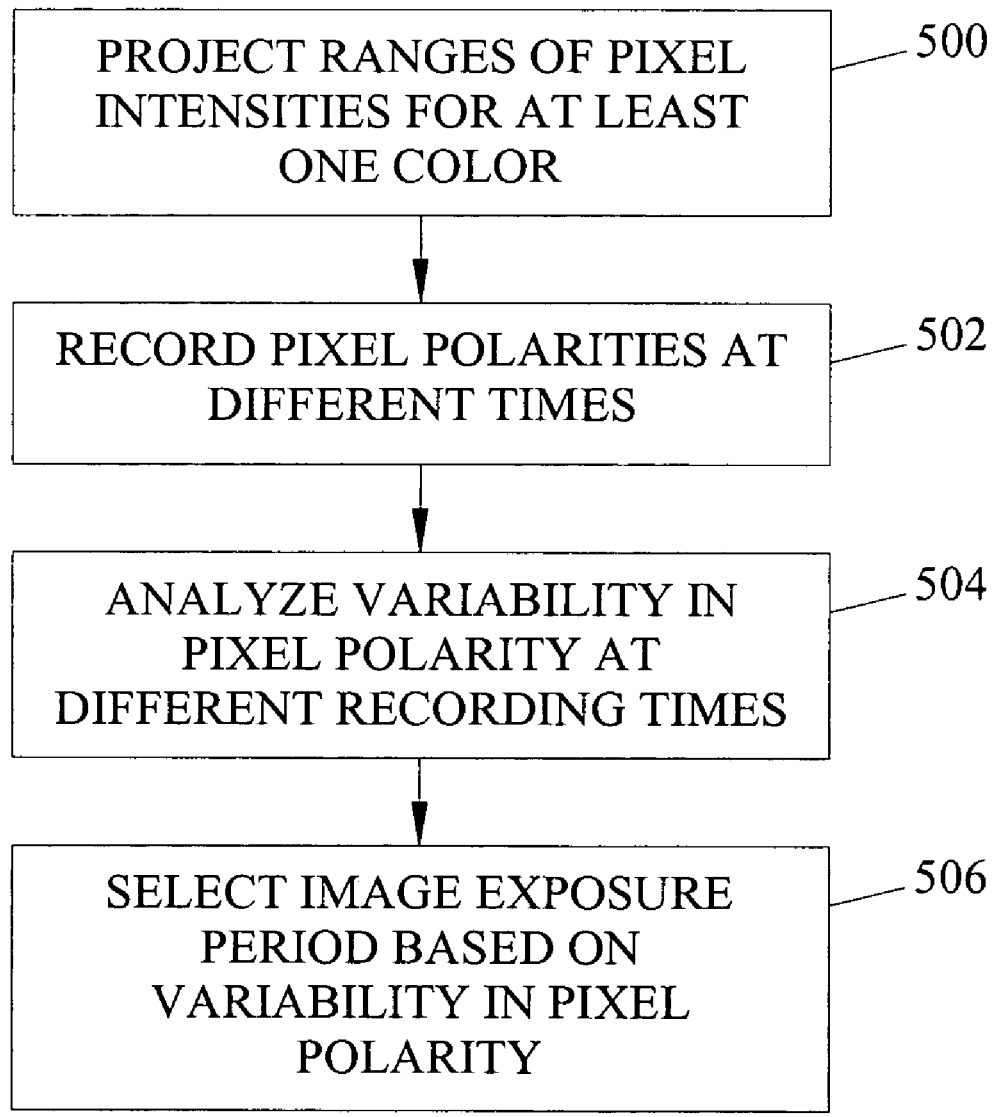
FIG. 5 is a flow chart illustrating exemplary steps for selecting an image exposure period based on pixel intensities and polarities for a color according to an embodiment of the subject matter described herein.
Figure 6:
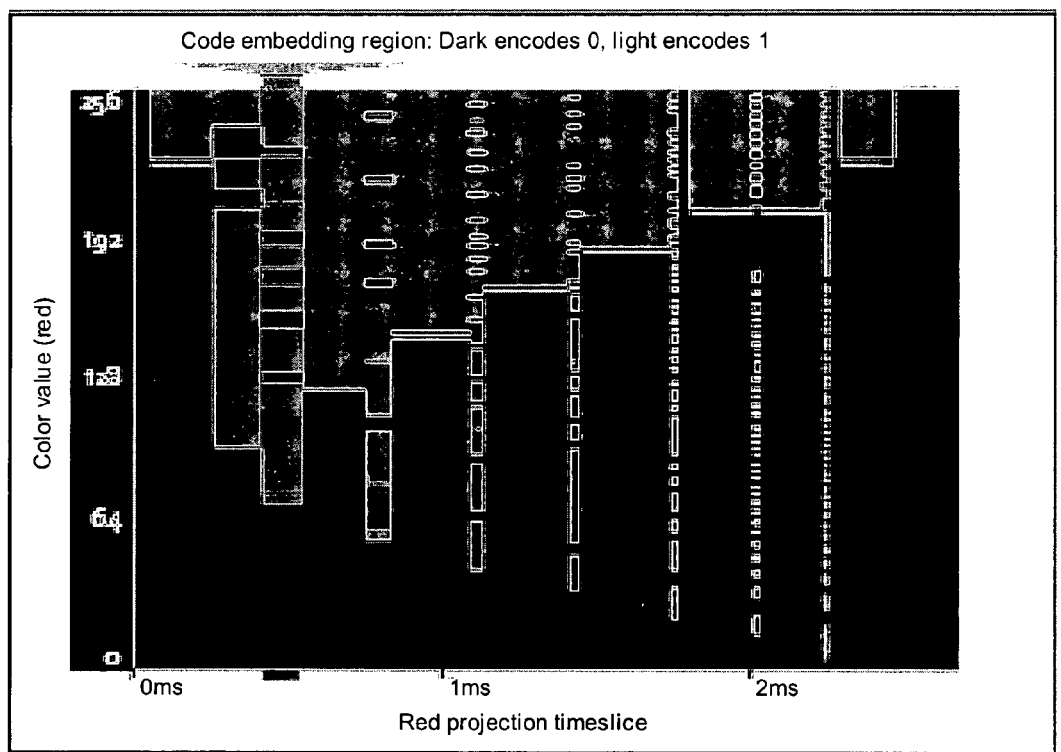
FIG. 6 is a diagram illustrating exemplary mirror flip sequences for all 256 values of red for a given commercially available projector.

In order to determine an ideal image exposure period, it is desirable to measure the mirror flip sequences for different intensity values of each of the red, green, and blue components of each pixel. FIG. 5 is a flow chart illustrating exemplary overall steps for selecting an image exposure period according to an embodiment of the subject matter described herein. Referring to FIG. 5, in step 500, ranges of pixel intensities are projected for at least one color. For example, if each pixel includes a red, green, and blue component, and each component has possible intensity values ranging from 0 to 256, step 500 may include projecting the full range of intensities for each pixel color. In step 502 the camera shutter is preferably opened to measure pixel polarities and corresponding mirror flip sequences at different times. FIG. 6 illustrates an example of mirror flip sequences generated using steps 500 and 502 of FIG. 5 for different intensities of red for a given pixel in projected image. In FIG. 6, the horizontal axis represents time. Each vertical column represents a mirror flip sequence for a full range of pixel intensities. The dark regions in each column represent pixel being off, and the light regions represent the pixel being on. The dark gray regions represent times when pixels are not reliably on or off. The vertical bar on the left hand side of FIG. 6 represents corresponding intensities of the color red. For example, in order to produce a dark shade of red having an intensity of between 0 and 64, the pixel is off for nearly the entire projection time slice. Similarly, to project a light shade of red having a pixel intensity value near 256, the pixel is on for nearly the entire time slice.

Returning to FIG. 5, in steps 504 and 506, pixel polarities are analyzed for different exposure periods, and an image exposure period is selected based on the variability of the polarities. In order to select an optimal image exposure period, it is desirable to select a time period on the horizontal axis in FIG. 6 for which pixel intensities can be varied to encode the structured light pattern without significantly changing the intensity that is displayed to the user. One example of a poor choice for the image exposure period occurs between about 0 and 0.1 ms. During the period from 0–0.1 ms, the pixel is off for nearly every intensity of red. Thus, if the pixel intensity in the user image is 128 and it is desirable to encode a light pixel of the structured light pattern, the pixel intensity value would have to be changed from 128 to about 220 to encode the light pixel. Since 220 would appear much brighter than 128 to the user, the embedding of the structured light pixel in the source image pixel would not be imperceptible to the user.

A better choice for the image exposure period would be a period in which the pixel polarity varies repeatedly between on and off for a substantial portion of the total range of pixel intensity values. Based on this criterion, a good choice for the image exposure period is represented by the shaded vertical bar labeled "code embedding region" between about 0.4 and 0.5 milliseconds in FIG. 6. During this period, the pixel varies repeatedly between on and off between about 64 and about 200 of the 0–256 intensity range. Accordingly, for source pixel intensity values between 64 and 200, an image can be encoded without significantly affecting the displayed intensity. For example, if the pixel intensity in the user image is 128 and it is desirable to encode a light pixel, the pixel intensity can be changed to the closest value that results in the mirror being on during the image exposure period. In the period from 0.4 to 0.5 milliseconds, the light pixel could be encoded by changing the pixel intensity from 128 to about 130, which represents the closest light polarity. Thus, the depth extraction system could detect the light pixel, and the user image would not be significantly changed.

Figure 7:
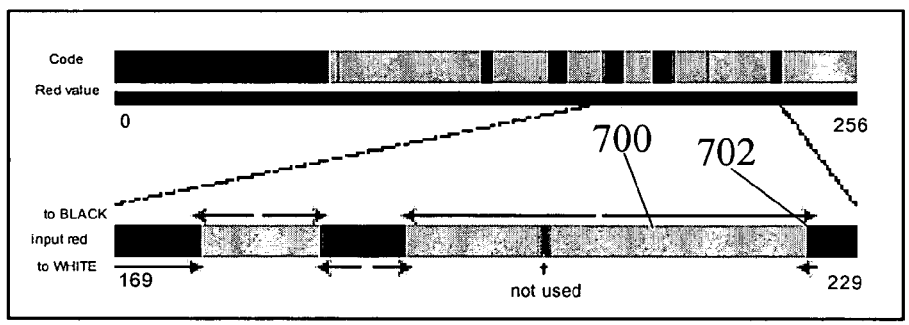
FIGS. 7A and 7B are diagrams illustrating mirror positions during the image exposure period for different intensity values of red and corresponding directions for encoding a pixel of a structured light pattern given a source pixel intensity value according to an embodiment of the subject matter described herein.

Once the image exposure period has been selected, structured light patterns can be embedded in the user images by selecting pixel intensity values that are closest to the original intensity values and so that the mirror positions or pixel polarities will correspond to the desired image to be encoded during the image exposure period. FIGS. 7A and 7B illustrate mirror positions for different values of red corresponding to the image exposure period illustrated in FIG. 6. In FIG. 7A, the mirror flip sequences for the entire range of intensity values for red are shown. The small bar below the mirror flip sequence of FIG. 7A illustrates the corresponding intensities of red. In FIG. 7B, a portion of the mirror flip sequences corresponding to a smaller range of pixel intensity values is shown. The arrows in FIG. 7B represent a direction and an amount by which an input pixel intensity would have to be changed in order to encode a pixel of the opposite polarity. For example, at position 700 in FIG. 7B, the source pixel is on or light. If it is desirable to encode a dark pixel in the structured light pattern, the source pixel would be changed in intensity corresponding to the direction of the arrow to an intensity indicated by position 702.

Figure 8:
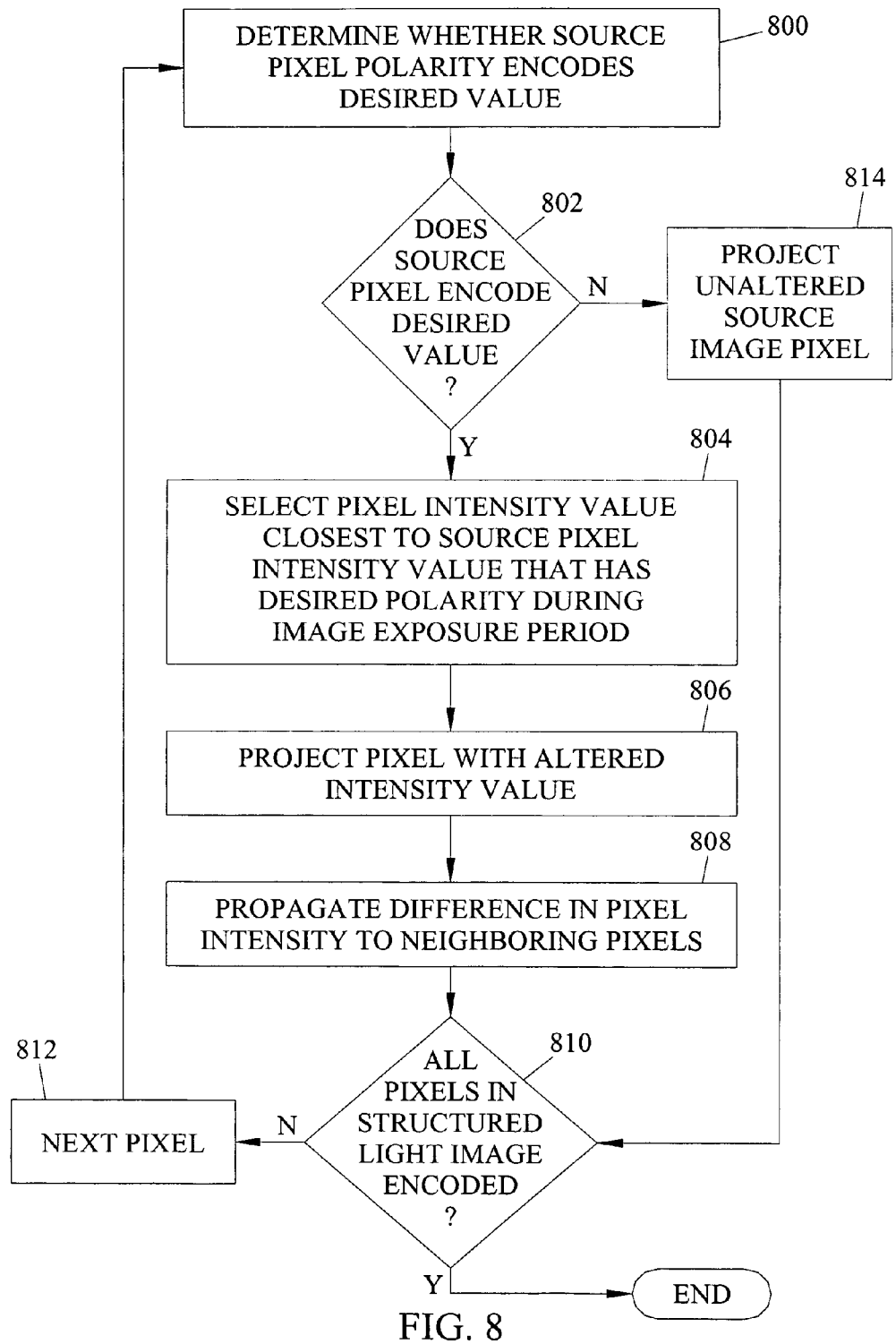
FIG. 8 is a flow chart illustrating an exemplary process for imperceptibly embedding a structured light pattern in a color image according to an embodiment of the subject matter described herein.

FIG. 8 is a flow chart illustrating exemplary steps for encoding structured light patterns in user images according to an embodiment of the subject matter described herein. Referring to FIG. 8, in step 800, it is determined whether the source pixel polarity encodes the desired value during the image exposure period. For example, if the pixel intensity value in the source image results in the pixel being on during the image exposure period, on is used to encode a binary 1, off is used to encode a binary 0, and the value desired to be encoded is a binary 0, the unaltered source pixel does not encode the desired value. Accordingly, control proceeds to step 804 where the pixel intensity value that is closest to the source pixel intensity value and that has the desired polarity during the image exposure period is chosen. In the example illustrated in FIG. 7B, the pixel intensity value may be changed from the intensity corresponding to 700 to the intensity corresponding to 702. In step 806, the pixel is projected with the altered intensity value. In order to correct for the change in pixel intensity, in step 808, the difference in pixel intensity values is propagated to neighboring pixels. For example, if the red pixel intensity value of a particular pixel is increased by four, and there are four neighboring pixels to the pixel that was changed, the intensity of the red component of each of the neighboring pixels may be decreased by one to compensate for the increase. The propagation of errors or changes in pixel intensities to neighboring pixels is referred to as dithering.

In step 810, it is determined whether all pixels in the structured light pattern have been encoded. If all pixels have not been encoded, control proceeds to step 812 where the next pixel in the structured light pattern is selected and steps 800–810 are repeated to encode the next pixel.

Returning to step 802, if it is determined that the source pixel polarity encodes the desired value, control proceeds to step 814 where the unaltered source pixel is projected. From step 814, control proceeds to step 810 where it is determined whether all pixels in the structured light pattern have been encoded. If all pixels have not been encoded, step 812 and 800–810 are repeated for the next pixel. The steps illustrated in FIG. 8 are repeated until all pixels in the structured light pattern have been encoded.

Figure 9:
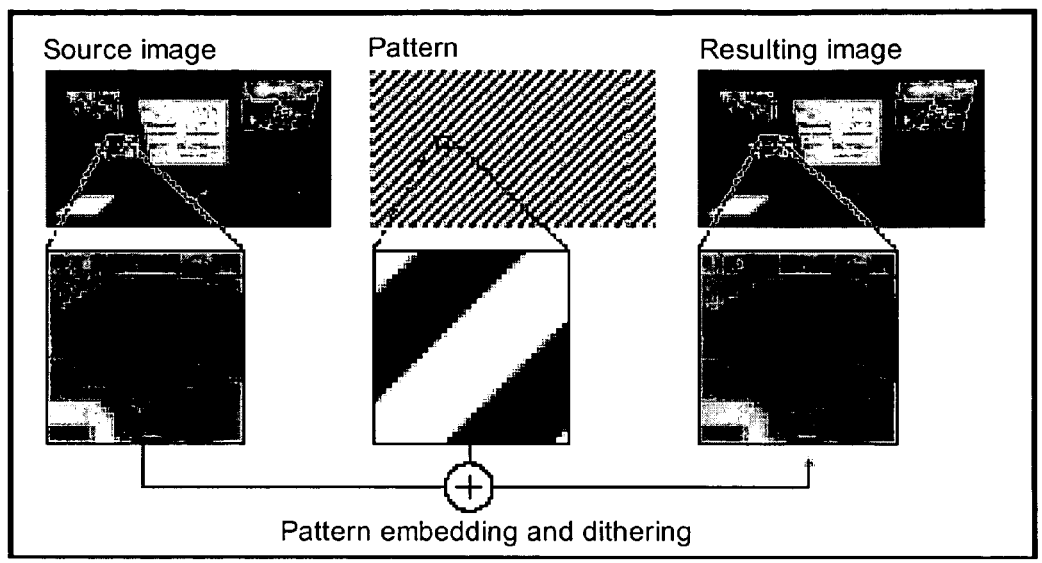
FIG. 9 is a block diagram illustrating an exemplary source image, a structured light pattern, and a resulting image according to an embodiment of the subject matter described herein.

FIG. 9 is a block diagram illustrating an exemplary source image, a binary structured light pattern to be encoded in a source image, and a resulting image. In FIG. 9, the source image includes various digital photographs and a paint application that may be displayed by a user's computer. The structured light pattern includes diagonal, alternating dark and light stripes that may be useful in depth extraction. In the resulting image, the checkerboard pattern that appears in the dark portions of the image is a result of the change in intensity from a dark red value to a value that encodes a light pixel from the pattern. For example, referring back to FIG. 6, during the image exposure period, the mirror is off for red values ranging from 0–64. Thus, in order to encode a light pixel value from the structured light pattern, it is necessary to change the intensity of the source pixel by as much as 64. Such a change may result in a visible difference in the final image.

In order to avoid this difficulty, the color channel used to encode the structured light pattern may be compressed before the encoding to eliminate ranges at the beginning and end of the color channel in which the pixel polarity does not vary during the image exposure period. For example, in FIG. 6, it may be desirable to eliminate intensities of red in the source image that range from 0–64 and intensities that are above 200. The resulting red channel would range from 64–200 in intensity. In such a compressed channel, if a source pixel has a value of (64, 0, 0) and it is desired to encode a light pixel, no change is necessary, since 64 is the lowest intensity value that corresponds to a light pixel. This can be contrasted with trying to encode a light pixel in the uncompressed red channel in which a source pixel may have luminosities of (0, 0, 0) and it is desirable to encode a light pixel. In such an example, it would be necessary to change the pixel intensity to (64, 0, 0), which would be noticeable to the user. Thus, by compressing the range of intensities to exclude regions of low polarity variability at the top and bottom of the intensity range, the encoding of the structured light pattern in the source image is less noticeable in the resulting image.

One problem with compressing the color channel used to encode the structured light pattern is such compression results in inaccurate color reproduction in the resulting image. For example, if the minimum luminosity of the red channel is changed from 0 to 64, pixels that would normally be black would appear as dark red. This effect may be undesirable to the user. In order to avoid this difficulty, according to another aspect of the subject matter described herein, the intensity ranges of the color channels that are not used to encode the structured light pattern may be compressed proportionally to the compression of the color channel used to encode the structured light pattern. For example, if the red channel is compressed to range from 64–200 in luminosity, the green and blue channels may likewise be compressed to range from 64–200 in luminosity. Compressing all of the color channels equally results in more accurate color reproduction in the final image. The drawback to compressing the color channels is a lack of tonal resolution for individual colors.

Figure 10:
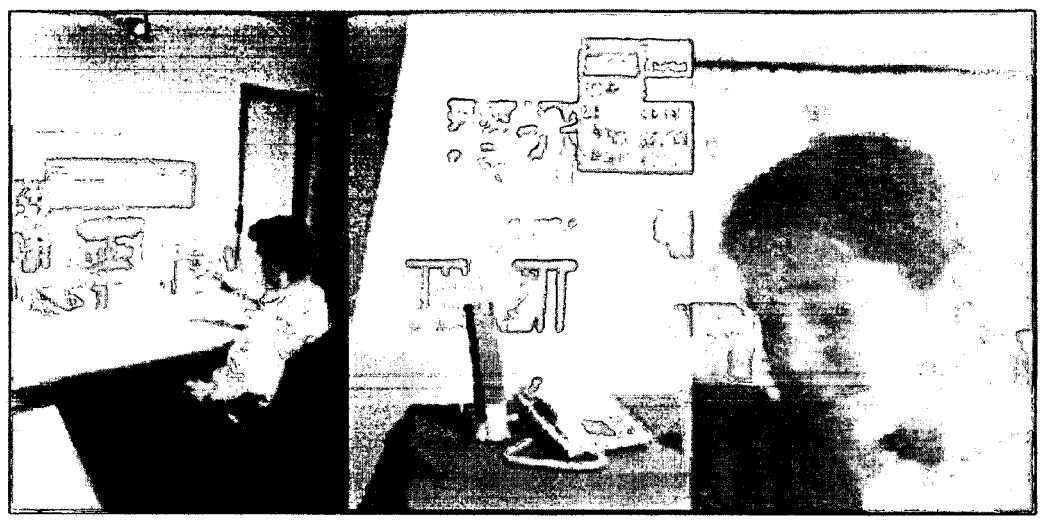
FIG. 10 illustrates exemplary reproduced images with embedded binary images according to an embodiment of the subject matter described herein.
Figures 11A, 11B, 11C:
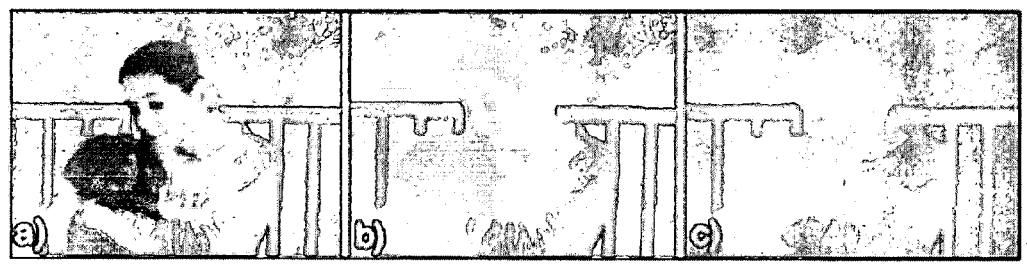
FIG. 11A–11C respectively illustrate an original image, the original image with a structured light pattern embedded using a single color, and an image in which all color channels are compressed equally according to an embodiment of the subject matter described herein.

FIG. 10 illustrates a projected user image with an embedded structured light pattern shown at three different levels of zoom. In FIG. 10, the lack of tonal resolution is less pronounced in the final images than in FIG. 9. FIGS. 11A–11C illustrate the use of color channel compression to improve color reproduction. FIG. 11A illustrates the original user image. FIG. 11B illustrates the image where only the red channel is compressed during projection. FIG. 11C illustrates the image where all three channels are compressed equally. In FIG. 11B, black pixels from the source image have a dark red color. In FIG. 11C, the dark red color is removed by compressing all color channels equally.

Figure 12:
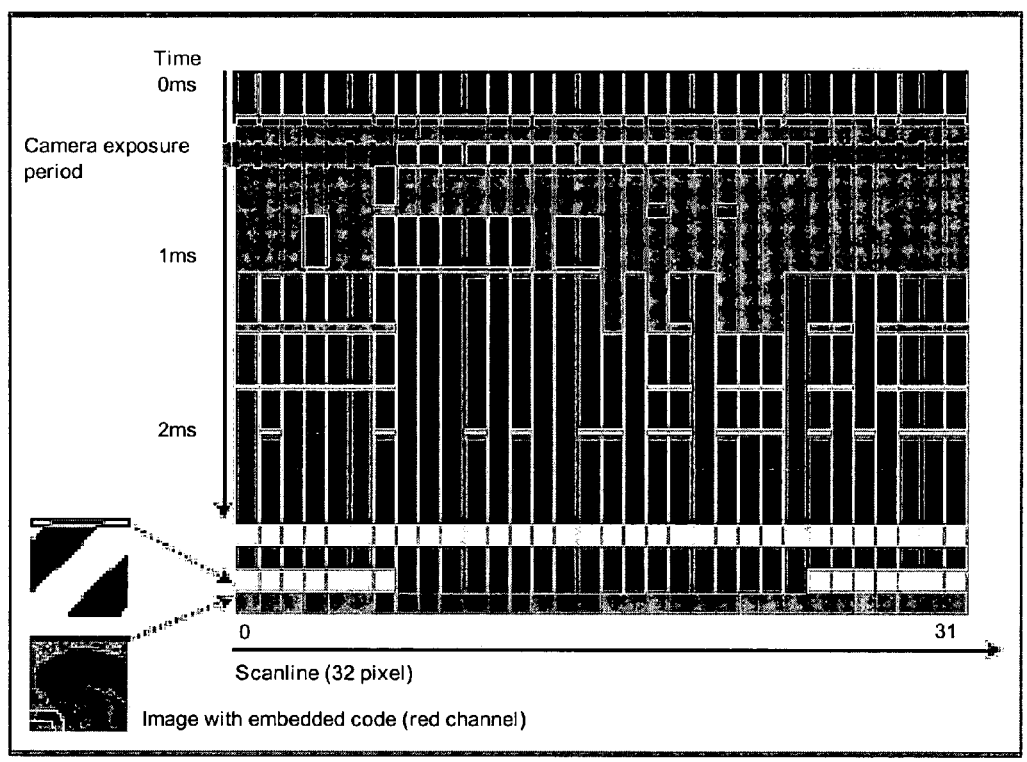
FIG. 12 is a diagram illustrating mirror positions and pixel intensities for encoding one line of the structured light pattern of FIG. 9 in one line of the source image of FIG. 9.

FIG. 12 is a diagram that illustrates the embedding of the binary image of FIG. 9 into the resulting image. In FIG. 12, the vertical axis represents time. The horizontal axis represents pixel polarities and intensities during each time period. The bottom row in FIG. 12 represents a horizontal scanline of pixels in the resulting image of FIG. 9. The next row represents a horizontal scanline of the structured light pattern that is encoded in the resulting image. The next row represents the different intensities of red used to encode the structured light pixels in the resulting image. The remaining rows in FIG. 12 represent pixel polarities used to produce each intensity of red. It can be seen that during the image exposure period, the pixels corresponding to the light portions of the structured light pattern are off and the pixels corresponding to the dark portions of the structured light pattern are on. Thus, FIG. 12 verifies that the structured light pattern is correctly encoded during the image exposure period.

Because the subject matter described herein allows binary images to be encoded in color images by changing pixel intensity values corresponding to one or more colors, off-the-shelf projectors can be used for embedding structured light patterns in projected color images and displaying the images on planar or non-planar surfaces. In order to verify the operation of the methods and systems described herein, a prototype system that concurrently acquires depth and displays a user application using off-the-shelf components in a standard office environment was developed. The system included two symmetrical projection and acquisition modules. The following sections describe components of the prototype and their operation to embed structured light patterns in a projected image, extract depth, and render the image on arbitrary surfaces.

Projectors

In the prototype, two ProjectionDesign® F1 projectors with SXGA resolution (1280×1024 pixels) were used. The projectors are provided with either a zoom lens or a wide angle fixed focal-length lens. Wide angle lenses were chosen so that the projection volume, with ceiling-mounted projection in an office, covers a desk and lights the user over a natural range of positions while sitting at the desk (about 1.5 m×1.5 m). ProjectionDesign® also offers a choice of three color wheels: a) 80° clear sector (the remainder of the wheel being divided between R, G, and B), b) 40° clear sector color wheel, and c) no clear sector at all, but a 6-sector wheel, RGBRGB, i.e., two sectors of each color, for faster switching between colors. For the prototype, the color wheel with the 40° clear sector was utilized, since it maximizes the continuous amount of time during which a single color is projected, giving us the best choice of camera exposure periods.

Video Cameras

Inexpensive Point Grey Dragonfly™ black and white video cameras with an IEEE 1394 (Firewire) interface were utilized. The Dragonfly™ cameras allow external synchronization, and they allow software control (through the 1394 interface) of various parameters. Most convenient for the present purposes is the synchronization delay control, which defines a time delay between the external synchronization trigger and the actual start of the camera exposure period. This programmable delay allows exact synchronization the camera to the image exposure period without any additional delay hardware.

The camera delay value can be fine-tuned by first projecting a still image with a binary pattern embedded in the desired image exposure period, and then scanning a broad range of camera delay values, capturing a 125 microseconds camera image with each delay setting and calculating the contrast in that image. The synchronization delay value resulting in the highest-contrast camera image can then be selected. This synchronization procedure takes less than two minutes.

Figure 13:
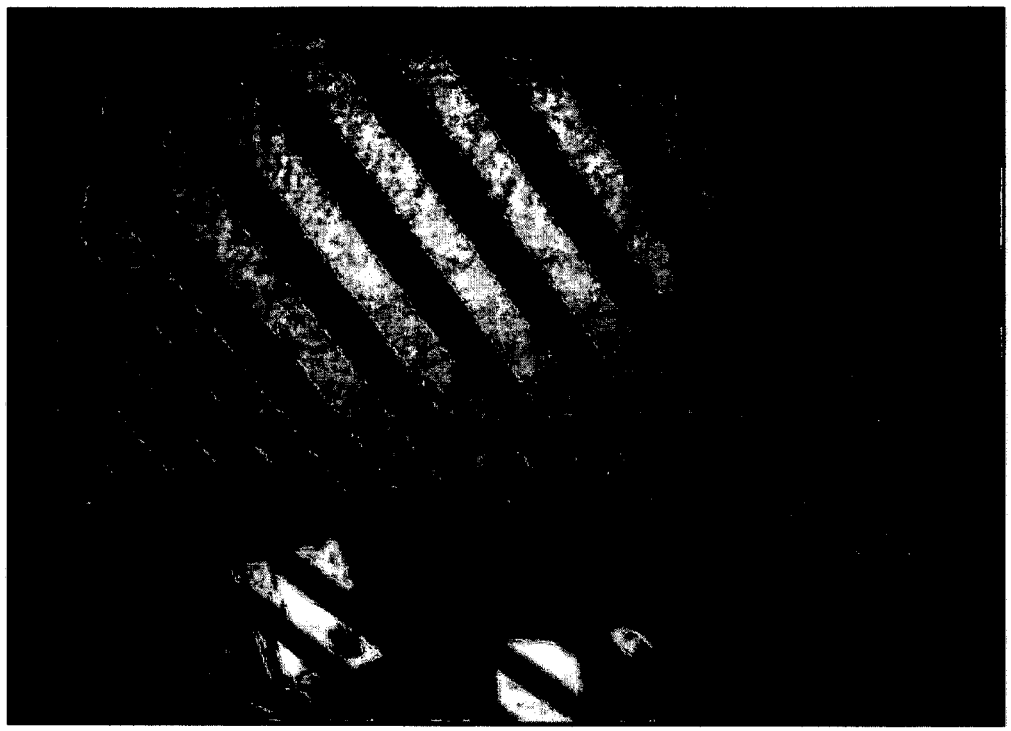
FIG. 13 is an image of a structured light pattern detected by a camera exposed during an image exposure period.

Due to the minimal exposure time of 125 microseconds on the Dragonfly™ camera, cross-talk from the adjacent mirror flips occurs. The lens is also preferably kept wide open (F1.2) to get enough brightness at acceptable noise levels. Even though faster and more sensitive cameras would result in higher contrast and an increased depth of field, the resulting images were fully adequate for present purposes. FIG. 13 shows a projected structured light pattern captured using the Dragonfly™ camera during the image exposure period. From FIG. 13, it can be seen that the camera is properly synchronized with the camera to detect the structured light pattern.

Synchronization of Cameras and Projectors

Two options for synchronization of the cameras and projectors include using an external sync generators and graphics boards featuring genlock or traditional graphics boards and a device to tap the vertical sync signal of the projected imagery. The first approach can be realized with off-the-shelf components only, using a commercial sync generator with a self-implemented, microcontroller-based sync generator. This is the classical solution of installing a 60 Hz sync generator and distributing its signal to all cameras and projectors.

Figures 14A, 14B, 14C:
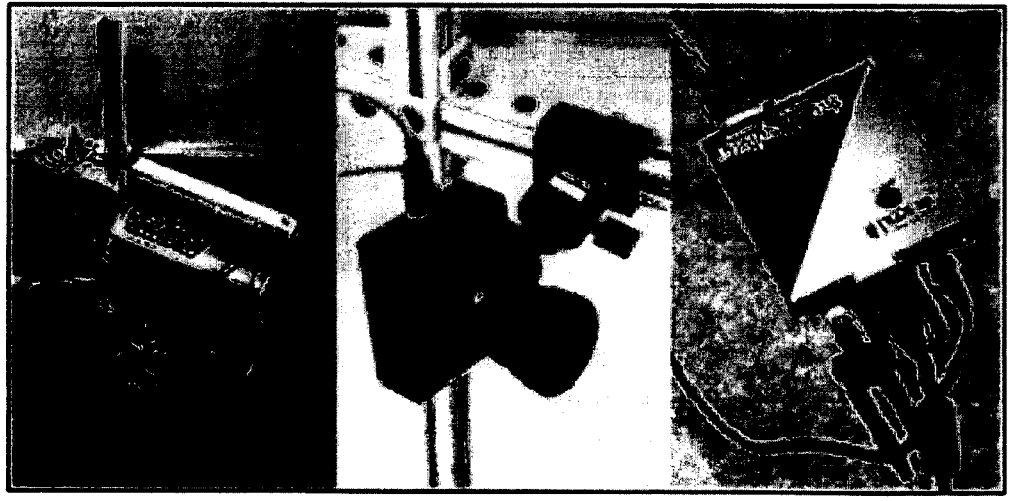
FIGS. 14A–14C illustrate exemplary hardware components of a system for embedding and detecting structured light patterns in projected color images according to an embodiment of the subject matter described herein.

The second approach is more involved since it requires a device for tapping the vertical sync signal. Once the device taps the vertical sync signal, the camera can be synchronized to its projector by connecting the projector's vertical sync signal to the external synchronization input of the camera. Using DVI instead of analog video in this setting is slightly more complex, because there is no isolated vertical sync signal going to the projector. This problem can be solved by obtaining a traditional vertical sync signal by tapping the appropriate pin inside of an off-the-shelf DVI repeater. FIGS. 14A–14C illustrate exemplary hardware used for implementing the second approach. More particularly, FIG. 14A illustrates the projector, FIG. 14B illustrates the camera, and FIG. 14C illustrates the DVI repeater with a tapped vertical sync signal.

System Calibration

The cameras and projectors must be calibrated intrinsically and extrinsically with relation to each other, and in case of setups consisting of more than one module, with respect to a common global world coordinate system. The calibration routine is embedded into the controller software, providing a user-friendly, mostly automatic procedure. Both intrinsic and extrinsic camera parameter estimations are based on Intel's Open Computer Vision library. For projector calibration, a checkerboard pattern is projected on two previously calibrated planes, resulting in two sets of related 3D points that enable calculation of projector position, orientation and frustum with adequate precision. Lens distortion errors of the projector are not considered in the calibration.

Module Configuration

The two modules that form the prototype system each included a PC (Dell Dimension 8300) with an nVIDIA Quadro FX 300G graphics board, a projector, and a gray scale camera. The projectors and cameras were mounted to the ceiling of an office. The genlock capability of the graphics board was used to work with overlapping projection regions and to work with external synchronization options. For a setup without overlapping projection regions, a less expensive graphics board without the genlock capability can be used.

Figure 15:
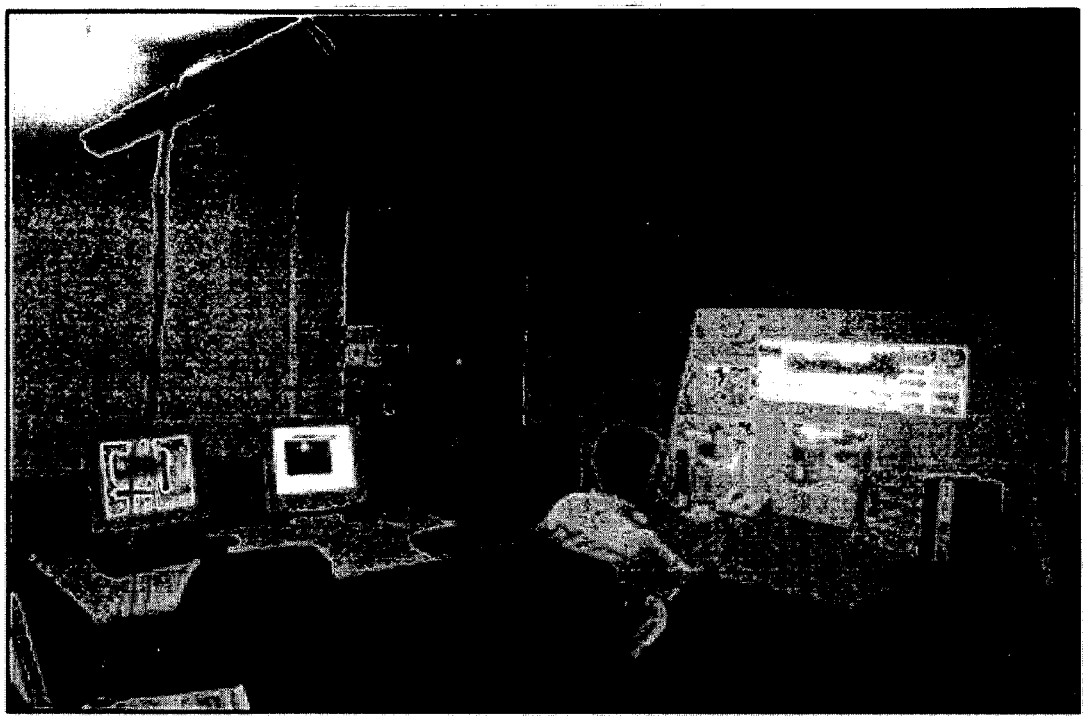
FIG. 15 is an image of an office environment including a system for embedding and detecting structured light patterns in a projected color image according to an embodiment of the subject matter described herein.

The two modules (referred to herein as Module 1 and Module 2) covered the working area of a user's desk (approximately 1.5 m×1.5 m). Module 1 covers the volume from the wall above the desk down to the back half of the desk. Module 2 covers the users body and the front part of the desk. FIG. 15 illustrates the physical configuration of the two modules in a user's office.

System Design: Software Architecture

Figure 16:
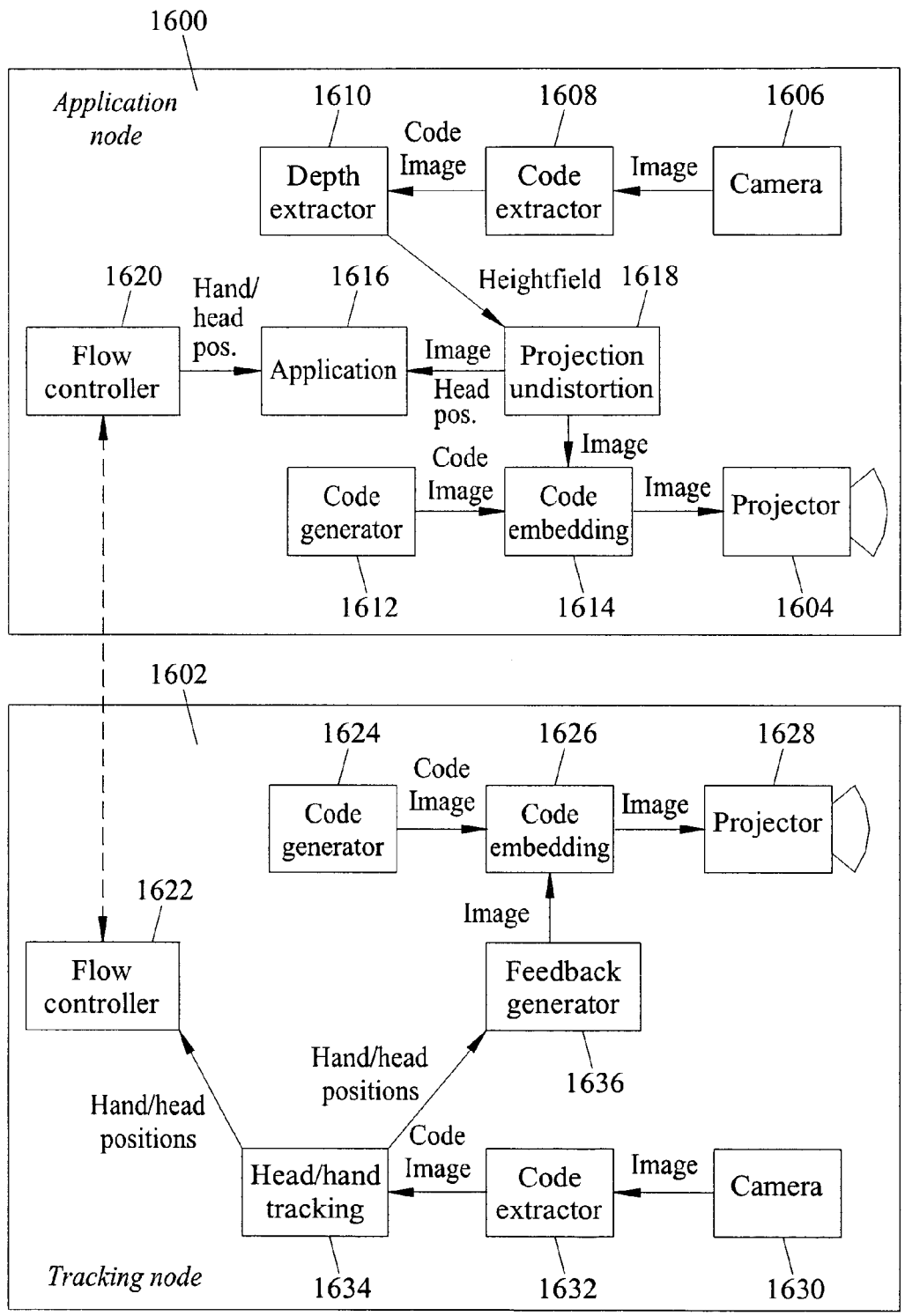
FIG. 16 is a block diagram illustrating an exemplary hardware and software architecture of a system for embedding and detecting structured light patterns in a projected color image according to an embodiment of the subject matter described herein.

The prototype implementation uses a modular software design to implement the individual components of the image generation and 3D acquisition pipelines. Depending on the desired task of both acquisition/projection modules in the physical setup, the pipelines can be reconfigured on-the-fly. Components have been implemented for depth acquisition, for projection undistortion, and for head- and hand-tracking including visual feedback. FIG. 16 depicts two pipelines including the data flow between the components. On each module, the pipelines are controlled by flow controller instances that communicate over a network. The components of the pipeline are implemented as Windows® DirectShow Filters, thus enabling simple reuse for a plenitude of applications.

In FIG. 16, modules 1600 and 1602 include various components for projecting images and performing structured light depth extraction. For example, module 1600 includes a projector 1604 for projecting a user image and a structured light pattern onto a surface, such as a wall in the user's office. Projector 1604 may be any suitable projector for projecting structured light and user images. In one implementation, projector 1604 may be a visible light projector. A camera 1606 is synchronized with projector 1604 to detect reflected structured light patterns. Camera 1606 may be any suitable device capable of detecting structured light in the visible light range during a user-selected exposure period. A code extractor 1608 extracts structured light patterns embedded in user images by analyzing pixel polarities during the image exposure period, as described above. A depth extractor 1610 extracts depth information from the reflected patterns.

A code generator 1612 generates the structured light patterns to be used in performing the depth extractions. A code embedding module 1614 embeds the structured light patterns in the user images using the algorithm described above for altering pixel intensity values. An application 1616 generates the user image to be displayed. For example, application 1616 may be any application program that produces a user interface capable of being projected onto an arbitrary surface. For example, the application may be an email, word processing, web browsing, or graphics application. A projection undistortion module 1618 receives the depth values from depth extractor 1610 regarding the projection surface and continuously adjusts display of the image for the projection surface. For example, projection undistortion module 1618 may pre-distort the user image so that the user image will appear undistorted on a non-planar projection surface. A flow controller 1620 controls flow between module 1600 and module 1602 over a network.

Module 1602 includes various components for tracking a user's head and hand positions and provides this data to module 1600 so that display of the image can be controlled based on the position of the user's head or hand. In the illustrated example, module 1602 also includes a flow controller 1622 for controlling data flow to and from module 1600. A code generator 1624 generates structured light patterns to be used in extracting depth information regarding the user's head or hands. A code embedding module 1626 embeds the code in a projected image. A projector 1628 projects the structured light patterns onto the user's head and hands. Like projector 1604, projector 1628 may be a visible light projector.

A camera 1630 detects the structured light patterns reflected from the users head or hands. A code extractor 1632 extracts the structured light patterns and outputs the patterns to a head/hand tracking module 1634. Head/hand tracking module 1634 generates head/hand position based on depth information calculated from the reflected structured light patterns. A feedback generator 1636 controls display of the user image by module 1600 based on the position of the user's head or hands. For example, when the user rotates his head, the point of view from which the images displayed may be altered.

The overall functions of modules 1 and 2 are as follows:
Module 1 1600 constantly tracks the surface of the desk and wall, sending its distance values to projection undistortion module 1618, which displays 2D images and 3D models onto the currently-measured surfaces. Projection undistortion module 1618 warps each image to account for the surface location and for its image to appear correctly from the user's current head position. Module 1 1600 also executes the simple painting application 1616 described above.

Module 2 1602 constantly tracks the user's head and hand positions and sends these values to module 1 1600. At present, module 2 1602 renders a simple flat field embedding visual feedback of the tracked hand position.

Depth Acquisition

Figures 17A, 17B, 17C:
FIG. 17A illustrates an exemplary Gray code pattern that may be embedded in a projected image according to an embodiment of the subject matter described herein.
FIG. 17B illustrates an extracted Gray code pattern corresponding to the pattern in FIG. 17A.
FIG. 17C illustrates an exemplary depth image produced from the transmitted and reflected Gray code patterns in FIGS. 17A and 17B.

Two examples of depth acquisition algorithms that may be used to simultaneously provide projection and display on arbitrary surfaces include a Gray code surface extraction algorithm and a single-shot depth extraction algorithm. The single-shot depth extraction algorithm may be based on algorithm described in P. Vuylsteke and A. Oosterlinck, "Range Image Acquisition with a Single Binary Coded Light Pattern," IEEE Transactions on Pattern Analysis and Machine Intelligence, Vol. 12, pp. 148–164, February 1990. In the Gray-code-based algorithm, code generator 1612 or 1624 sends a sequence of 8 stripe pattern images to the code embedding module 1614 or 1626, each representing a bit in the Gray code. Additionally, two reference images (all white and all black) are embedded for easier extraction. Code extractor 1608 or 1632 extracts this bit pattern from the sequence of acquired camera images using a standard thresholding algorithm. The intersection between the ray through the camera pixel and the corresponding projector plane as defined by the extracted Gray code defines the position in 3D space (See Bitner et al., "Efficient Generation of the Binary Reflected Gray Code and Its Applications", *Communications of the ACM* 19, 9, 517–521). FIGS. 17A–17C show a visualization of three stages of depth extraction using a Gray code. More particularly, FIG. 17A illustrates a Gray code structured light pattern being projected onto a surface in a corner of a room. FIG. 17B illustrates the decoded Gray code value extracted from the reflected structured light pattern. FIG. 17C illustrates the corresponding depth image computed by depth extractor 1610.

The stability of the acquired depth field is increased by only reconstructing depth at pixels at whose locations the same Gray code value has been detected over multiple frames. This both eliminates the effects of camera noise as well as transient changes of the depth, e.g. caused by a user moving in front of the projector. Finally, a small Gaussian filter kernel is applied to the depth field to minimize the stair-effects caused by the finite resolution of the Gray code.

In the initial prototype implementation, it takes approximately 15 s to acquire a smooth and stable depth field. Changes remaining static in the scene for a longer period of time are then updated at about the same rate, whereas transient changes are ignored as mentioned before.

Figure 18:
FIG. 18 is a depth map of a user generated by a single-shot depth extraction algorithm according to an embodiment of the subject matter described herein.

The single-shot method for acquiring depth can be used for applications in which it is desirable to acquire dynamic moving scenes. FIG. 18 illustrates a depth map of a human user created with an initial implementation of the single-shot depth extraction algorithm. The single-shot depth extraction algorithm is described in further detail in the above-referenced publication by Vuylsteke and Oosterlinck.

Although two algorithms for depth extraction have been described herein, the subject matter described herein is not limited to performing depth extraction using these methods. Any suitable structured light depth extraction algorithm for acquiring depth based on structured light patterns is intended to be within the scope of the subject matter described herein.

Target Tracking

In the prototype, tracking module 1634 detects the user's hand and head position using a simple and efficient single-shot tracking method in real time (at 20 frames per second, the present camera frame route). Top projector 1604 is used as a lamp, illuminating the user and work area. The light has an embedded horizontal stripe pattern projected onto the desk (tracking region) and a constant white code for the head region. The code is completely invisible to the user.

Figures 19A, 19B:
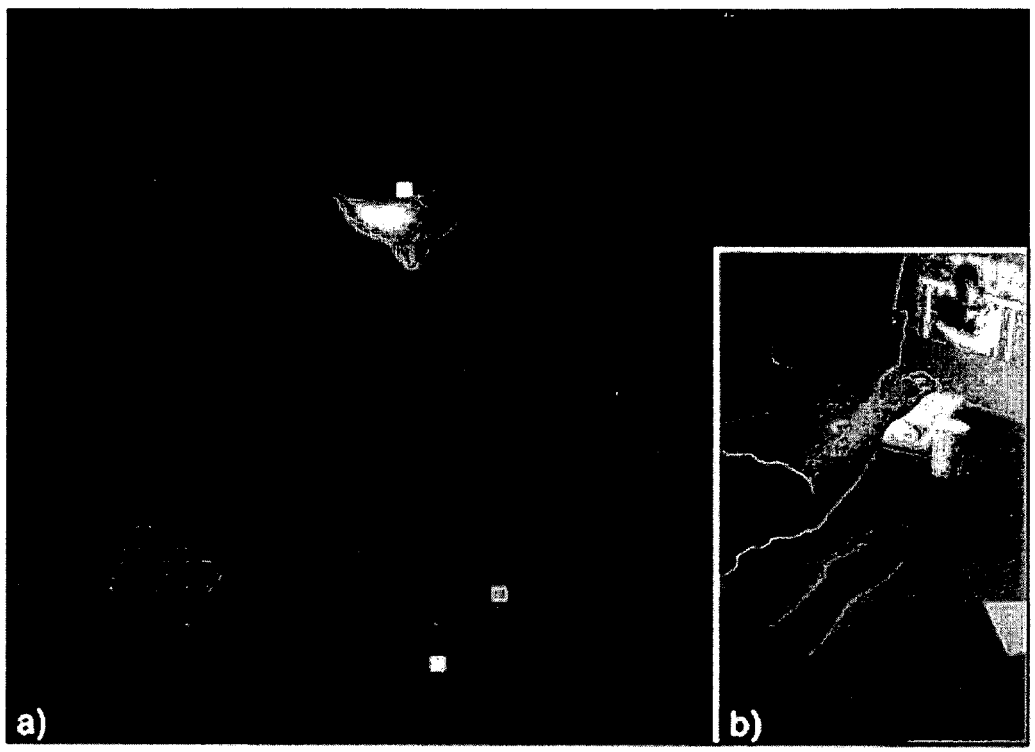
FIGS. 19A and 19B are images of a user illustrating exemplary operation of an imperceptible-structured-light-based tracking system according to an embodiment of the subject matter described herein.

The initialization step consists of taking an averaged sample image showing an empty table, which is later used as reference image. The hand tracking works by detecting both the hand and its shadow in the tracking region. Image regions that are darker than the reference frame are classified as shadow, whereas brighter regions are classified as hand. The external positions (closest to the wall) for both the hand and the shadow are extracted from these classified regions. The projector scanline projecting at the table location of the shadow external position is easily reconstructed by counting the number of stripes until the detected external point is reached. The intersection of the corresponding 3D projector plane and the camera ray corresponding to the detected 2D hand point returns the location of the hand in space. The regions and the detected external points are depicted in FIGS. 19A and 19B. FIG. 19A illustrates the image detected by the structured light camera. FIG. 19B illustrates the reproduced image of the user's hand over the user's desk.

The head position is defined as the brightest spot inside the head tracking region. The current prototype implementation assumes head motion on a constant plane in 3D space. The prototype can be extended to implement 3D tracking by projecting a code pattern into the head tracking region, enabling additional depth reconstruction similar to the depth reconstruction methods described above.

Both hand and head positions are integrated over time to provide a smooth motion path to the application code. In the sample application, the user receives feedback on the detected hand position both by illuminating the finger using the top projector and by a cursor inside the application area. The detected head position is fed into projection undistortion module 1618 for a 3D image projection with correct perspective.

Adaptive Display onto Non-planar Surfaces

The depth extraction capability of the methods and systems described herein enables undistorted display on non-planar projection surfaces. Non-planar projection surfaces are typical situation in an office environment with cluttered desks, bookshelves, drawers, etc. Several standard methods for a projection display to deal with objects on the desk include ignoring the objects and displaying distorted images, avoiding projection on non-planar surfaces, or integrating the objects into the display scene as part of the projection surface.

Figure 20:
FIG. 20 is an image illustrating undistorted projection of a user image on non-planar surfaces in an office according to an embodiment of the subject matter described herein.

In the prototype system, the depth extraction capabilities are used to frequently update the geometry of the projection surface. A standard two-pass rendering method as described in Raskar et al., "The Office of the Future: A Unified Approach to Image-Based Modeling and Spatially Immersive Displays," *Proceedings of SIGGRAPH* 98, 179–188 (July 1998) may be utilized. In this method, the image from the user's point of view is rendered into a texture. Then, the surface geometry is rendered as a regular grid from the projector's point of view, with the application texture applied using projective texturing. Holes in the reconstructed depth field are filled using an interpolation scheme. The resulting view is presented in FIG. 20. More particularly, FIG. 20 includes three different magnifications of an image, part of which is projected on a wall in the user's office, another part of which is projected on a portion of the user's desk, and another part of which is projected on an object on the user's desk. The wall, the desk, and the object form a non-planar surface. Because the image being projected is corrected to account for the different depths of the non-planar surface, the image appears undistorted on all of the surfaces.

Using current graphics hardware, the undistortion step only imposes a small performance penalty. The achievable frame rate in the prototype is limited by the texture upload and frame buffer read-back bandwidth. For a production environment, these limiting steps can be eliminated by integrating the application output context directly into the undistortion filter.

Integrated Application

Figure 21:
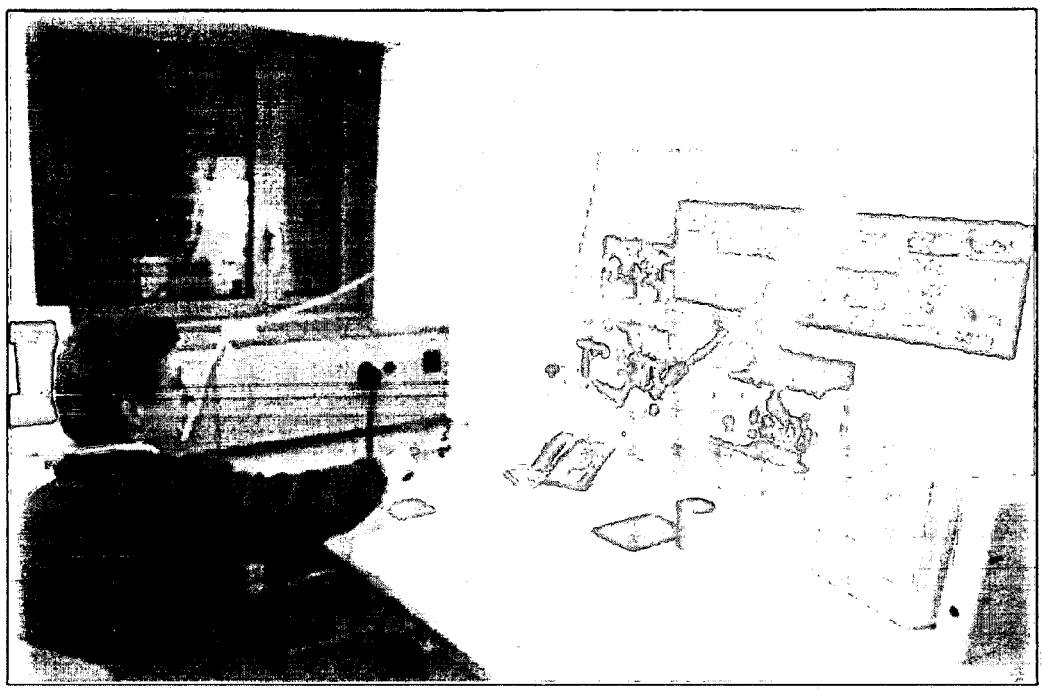
FIG. 21 is an image illustrating a paint program being projected on a wall in an office where the image includes embedded imperceptible structured light patterns according to an embodiment of the subject matter described herein.

The above-described tracking and display capabilities can be integrated into a simple paint program. FIG. 21 illustrates a paint program being projected on a wall in a user's office where the paintbrush is controlled by tracked movement of the user's hand. The user's head is also tracked for perspectively correct 3D rendering respectively. The paintbrush releases circular "splats" at the current hand position. They are blended together for a smooth look. The size of the splats is defined by the speed of the brush, always resulting in a continuous, smooth line in space. The application state, including color selection, is controlled using simple voice commands for "keyboard-free" operation. The display is customized to the user's head position so the user can observe the current 3D painting from a variety of viewing positions by direct head movement.

Conclusions with Regard to Prototype System

The prototype described above implements an approach for imperceptible structured light, allowing simultaneous immersive display and real-time 3D acquisition and tracking in the same environment—preferably an ordinary office. Furthermore, tracker encumberances for the hand and head are eliminated by an imperceptible-structured-light-based tracking system.

The prototype described above demonstrates the feasibility of these capabilities:

Tracking. The user's head and hand can be tracked imperceptibly, allowing encumberance-free hand-guided interaction and encumberance-free head-tracking.

Depth acquisition and rendering to non-planar surfaces. The acquisition loop operates in parallel with display, monitoring changes in the 3D display environment (such as movement of objects on the desk) and supplying the renderer with constantly updated estimates of the 3D location of every pixel of the display surface. The renderer can generate images properly warped to a desk, desk objects or walls with the correct geometry as seen from the user head's point of view.

Although the prototype consists only of two modules, each with a PC, projector, and camera, additional modules can be added to achieve an increasingly immersive environment.

Stereo Projection

One capability not described above is stereo projection. Of the many possibilities for achieving stereo, a method of stereo can be adopted that will also enhance the system's surface and target acquisition capabilities. For example, a variation of the stereo approach used in Gross et al., "blue-c: A spatially Immersive Display and 3D Video Portal for Telepresence," *SIGGRAPH* 2003 *Conference Proceedings*, ACM SIGGRAPH Annual Conference Series (2003) can be used with the methods and systems described herein. They employ actively switching stereo glasses worn by the user and two (LCD) projectors for each wall. An electronic shutter in front of each projector blocks a projector's light from the screen when the user is looking at the image from the other projector.

Improved 3D Acquisition

In addition to currently available structured light acquisition methods that can be implemented using the present methods, simultaneous projection of different patterns using different time slots can be utilized to improve the depth extraction.

Continuous, Fully-automatic Calibration

In the prototype described above, an initial calibration was required. According to an alternate implementation of the subject matter described herein, this initial calibration can be eliminated using an automatic continuous calibration mechanism as described in Welch et al., "SCAAT: Incremental Tracking with Incomplete Information," *Computer Graphics* 31, Annual Conference Series, 333–344 (1997). The possibility to continue projecting calibration patterns during run time of an application enables continuous refinement of the calibration parameters. Such a capability would dramatically increase the utility of the methods and systems described herein for portable acquisition and display situations.

Scaling to Larger Systems

Many applications may require display and tracking in larger areas, so it is desirable for the new capabilities this approach provides to still be available in systems with a larger number of projectors and cameras. One common issue is one of light control: when a vision algorithm wants a camera to take an (imperceptible) look at the scene, it wants to impose its own structured light pattern on the scene and be assured that no illumination from other projectors will interfere. For the following discussion, a "module" refers to the set of cameras and projectors associated with a single camera exposure period.

Projector Synchronization

A common requirement for overlapping projection regions is precise genlocking of the video signals. This feature is available on current high-end PC graphics boards (e.g. nVidia Quadro™ FX3000G, 3Dlabs Wildcat™). The present measurements show that the projector syncs itself precisely onto the input signal under the condition that it is fed with the projector's native refresh rate (typically 60 Hz). Sync signals between different groups of projectors can be delayed either by the graphics board (Quadro™ FX3000G) or by using external signal generators to introduce time shifts.

Scaling up to Three Modules

In one exemplary implementation, the subject matter described herein can be scaled upwards to include three modules so that one camera exposure period is available per primary color. During one module's exposure period, all the projectors in the other modules always show black (the equivalent of embedding an all-zero binary code image). In contrast to the single-module approach that leaves the full color palette for the unused color channels, all projectors in the three-module approach preferably use the reduced color palette on all channels.

Scaling from Four to Nine Modules

Scaling can take advantage of the fact that during any camera exposure period, a projector is emitting light of one primary color. So, by adding a color filter to the camera, it will detect very little light from a different projector emitting another primary color even if it is exposed during the same period. In one exemplary implementation, the projectors can be divided into three classes, offsetting the synchronization of each class by the duration of one color sector in the color wheel. When the second class is projecting the first color, the first class will already be displaying the second color. When the third class displays the first color, the second class will be displaying the second color, and first the third color (FIG. 22), hence, 9 projectors can be used concurrently without interference.

Figure 22:
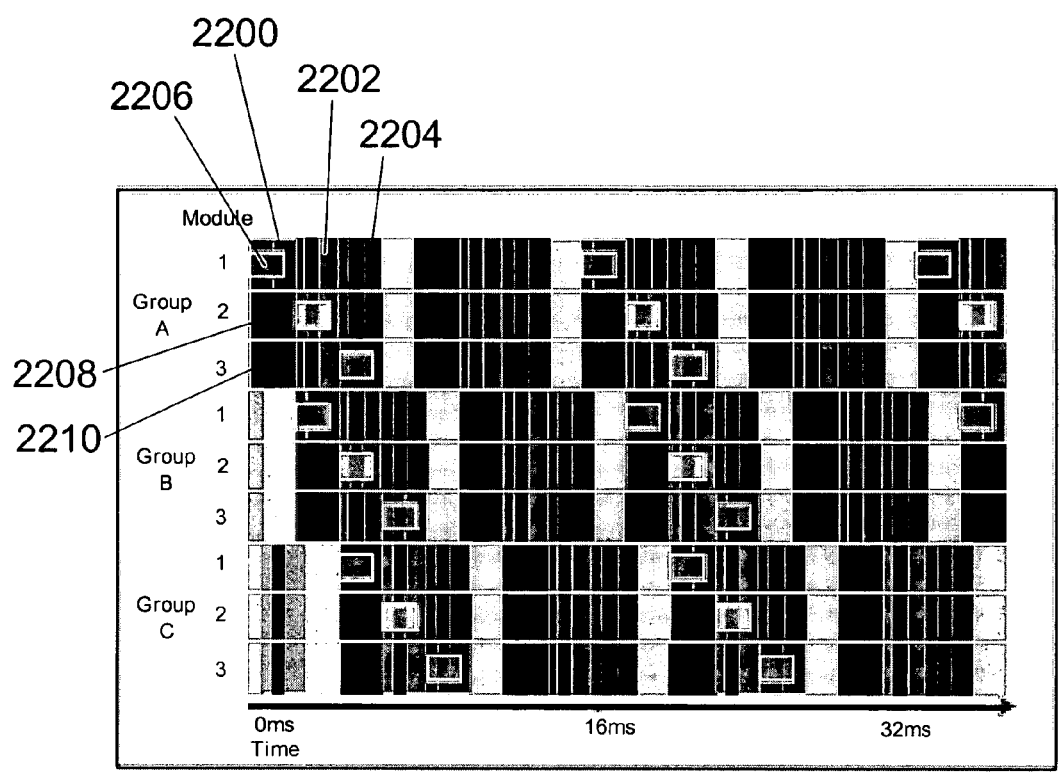
FIG. 22 is a diagram illustrating scalability of a system for embedding and detecting structured light patterns in projected color images according to an embodiment of the subject matter described herein.

In FIG. 22, the horizontal axis represents time. The vertical axis represents color projections within each class or group. The vertical stripes represent red, green, and blue projection periods. For example, for projector group A, stripe 2200 represents a red projection period, stripe 2202 represents a green projection period, and stripe 2204 represents a blue projection period. The white vertical stripes represent clear projection periods that are not used to embed structured light patterns. The white rectangles within each color projection period represent camera exposure periods during each projection period. For example, for projection group A, rectangle 2206 represents exposure of camera 1 during projection of a structured light pattern encoded in a red channel by projector 1.

In order to avoid interference by light from other projectors during an exposure period for one projector, the other projectors are preferably controlled to project pixel polarities corresponding to a constant pixel polarity during the exposure period. For example, referring back to FIG. 6, during the image exposure period, pixel intensity values for the projectors not being detected may be varied such that the polarities correspond to off polarities during the exposure period. Since the pixels for the non-detected projectors are set to off, pixels encoded by the projector being detected will be readable, even in areas of image overlap. Returning to FIG. 22, the dark vertical stripes, such as stripe 2210, represent periods during which pixel polarities for non-encoding projectors are set to off during an image exposure period for another projector.

From FIG. 22, it can be seen that using different color channels to encode structured light patterns increases the rate of acquiring depth information over a system that uses a single color channel to encode the patterns. In addition, using multiple cameras and multiple projectors allows a projection of larger source image and acquisition of depth information for a larger region. Finally, by offsetting projection and camera exposure periods in time and controlling the projectors to project non-interfering light during the exposure periods of other projectors, interference is reduced.

Scaling to More Than Nine Modules

Another scaling approach is based on the classic museum guard problem. Given a particular physical arrangement of modules in a room, each module must be assigned one of 9 distinct time/color IDs in such a way that frusta of projectors with the same ID don't intersect within the room. In this way, no surface in the room can be illuminated by multiple projectors with the same time/color ID, and thus cause ambiguity of projector source within any camera image.

Although the subject matter described above relates primarily to imperceptibly embedding structured light patterns in images, acquiring depth information from the structured light patterns, and using imperceptible structured light patterns to track user movement, the subject matter described herein is not limited to these uses of imperceptible structured light. Any suitable use for imperceptible structured light patterns encoded as described above is intended to be within the scope of the subject matter described herein. For example, another use for imperceptible structured light patterns includes using the patterns to encode information that is intended for viewing by a predetermined end user or group of users having detection equipment synchronized to the image exposure period. For example, users in a group for which perception of the structured light pattern is desired may wear special glasses to detect the image.

The disclosure of each of the publications referenced herein is hereby expressly incorporated herein by reference in its entirety. It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for embedding a structured light pattern in a color user image and for projecting the user image, the method comprising:
    (a) varying pixel intensity values for a first visible light color in a color user image so that pixel polarities encode a first structured light pattern during a selected image exposure period and so that varied pixel intensity values have a predetermined relationship with respect to original pixel intensity values in the user image;
    (b) projecting the user image with the embedded structured light pattern onto a surface; and
    (c) detecting the first structured light pattern during the image exposure period.

2. The method of claim 1 wherein varying the pixel intensity values includes, for each pixel in the first structured light pattern:
    (a) determining whether a polarity of a pixel in the user image encodes a desired value corresponding to a pixel in the first structured light pattern during the selected image exposure period, the pixel in the user image having a first intensity value; and
    (b) in response to determining that the polarity of the pixel in the user image does not encode the desired value, changing the first intensity value to a second intensity value, the second intensity value being the closest intensity value to the first intensity value that encodes the desired value during the image exposure period.

3. The method of claim 2 comprising calculating a difference between the second pixel intensity value and the first pixel intensity value and propagating the difference to pixels adjacent to the pixel in the user image.

4. The method of claim 1 wherein varying pixel intensity values comprises:
    (a) compressing a range of intensity values for the first visible light color in the user image to exclude intensities at a beginning and an end of the range for which pixel polarity has a constant value; and
    (b) selecting, from the compressed range, the pixel intensity values whose polarities encode the first structured light pattern.

5. The method of claim 4 comprising compressing a range of pixel intensity values for at least one second visible light color in the user image proportionally to the compressing of the range of intensity values for the first visible light color.

6. The method of claim 1 wherein varying pixel intensity values includes varying the pixel intensity values without modifying a projector used to project the user image.

7. The method of claim 1 comprising:
    (a) calculating depth information based on the detected structured light pattern; and
    (b) adjusting projection of the user image based on the depth information.

8. The method of claim 7 wherein projecting the user image onto a surface includes projecting the user image onto a non-planar surface and wherein adjusting display of the user image includes pre-distorting the user image such that a projection of the user image on the non-planar surface appears undistorted.

9. The method of claim 1 wherein projecting the user image includes projecting an interface generated by a computer software application.

10. The method of claim 1 wherein projecting the user image comprises projecting the user image using a single projector and wherein detecting the first structured light pattern includes detecting the first structured light pattern using a single camera.

11. The method of claim 1 wherein projecting the user image includes projecting portions of the user image using a plurality of projectors and wherein detecting the first structured light pattern includes detecting the first structured light pattern using a plurality of cameras.

12. The method of claim 11 wherein projecting portions of the user image using a plurality of projectors includes projecting a first portion of the user image including the first structured light pattern and projecting a second portion of the user image that overlaps with the first portion of the user image in a manner that does not interfere with detection of the first structured light pattern during the selected image exposure period.

13. The method of claim 12 wherein projecting a first portion of the user image including a first structured light pattern includes encoding the first structured light pattern using different intensities of the first visible light color and wherein projecting the second portion of the user image in a manner that does not interfere with detection of the first structured light pattern includes varying intensities of the first visible light color in the second portion to encode a common value during the selected image exposure period.

14. The method of claim 1 comprising selecting the image exposure period based on analysis of pixel polarities.

15. The method of claim 14 wherein selecting the image exposure period includes analyzing mirror flip sequences of a projector used to project the user image for different intensities of the first visible light color.

16. The method of claim 14 wherein selecting the image exposure period includes selecting a time during which pixel polarities vary between on and off states for a range of intensities of the first visible light color.

17. The method of claim 1 comprising imperceptibly projecting a second structured light pattern and tracking motion of a user based on the second structured light pattern.

18. The method of claim 17 comprising controlling projection of the user image based on the motion of the user.

19. A system for embedding a structured light pattern in a color user image and for projecting the user image, the method comprising:
   (a) an embedding module for varying pixel intensity values for a first visible light color in a color user image so that pixel polarities encode a first structured light pattern during a selected image exposure period and so that varied pixel intensity values have a predetermined relationship with respect to original pixel intensity values in the user image;
   (b) at least one projector for projecting the user image with the embedded structured light pattern onto a surface; and
   (c) at least one detector for detecting the first structured light pattern during the image exposure period.

20. The system of claim 19 wherein, in varying the pixel intensity values, the embedding module is adapted to, for each pixel in the first structured light pattern:
   (a) determine whether a polarity of a pixel in the user image encodes a desired value corresponding to a pixel in the first structured light pattern during the selected image exposure period, the pixel in the user image having a first intensity value; and
   (b) in response to determining that the polarity of the pixel in the user image does not encode the desired value, change the first intensity value to a second intensity value, the second intensity value being the closest intensity value to the first intensity value that encodes the desired value during the image exposure period.

21. The system of claim 20 wherein the embedding module is adapted to calculate a difference between the second pixel intensity value and the first pixel intensity value and propagate the difference to pixels adjacent to the pixel in the user image.

22. The system of claim 19 wherein, in varying pixel intensity values, the embedding module is adapted to:
   (a) compress a range of intensity values for the first visible light color in the user image to exclude intensities at a beginning and an end of the range for which pixel polarity has a constant value; and
   (b) select, from the compressed range, the pixel intensity values whose polarities encode the first structured light pattern.

23. The system of claim 22 wherein the embedding module is adapted to compress a range of pixel intensity values for at least one second visible light color in the user image proportionally to the compressing of the range of intensity values for the first visible light color.

24. The system of claim 19 comprising:
   (a) a depth extractor for calculating depth information based on the detected structured light pattern; and
   (b) a projection undistortion module adjusting projection of the user image based on the depth information.

25. The system of claim 24 wherein the at least one projector is adapted to project the user image onto a non-planar surface and wherein, in adjusting projection of the user image, the projection undistortion module is adapted to pre-distort the user image such that a projection of the user image on the non-planar surface appears undistorted.

26. The system of claim 19 wherein the at least one projector is adapted to project an interface generated by a computer software application.

27. The system of claim 19 the at least one projector comprises a single projector and wherein the at least one detector comprises a single detector.

28. The system of claim 19 wherein the at least one projector comprises a plurality of projectors for projecting portions of the user image and wherein the at least one detector comprises a plurality of detectors for detecting portions of the first structured light pattern.

29. The system of claim 28 wherein the plurality of projectors includes a first projector for projecting a first portion of the user image including the first structured light pattern and a second projector for projecting a second portion of the user image that overlaps with the first portion of the user image in a manner that does not interfere with detection of the first structured light pattern during the selected image exposure period.

30. The system of claim 29 wherein the first projector is adapted to project the first portion of the user image encoding the first structured light pattern using different intensities of the first visible light color and wherein the second projector is adapted to project the second portion of the user image with intensities of the first visible light color in the second portion encoding a common value during the selected image exposure period.

31. The system of claim 19 wherein the image exposure period is selected based on analysis of mirror flip sequences of the projector corresponding to different intensities of the first visible light color.

32. The system of claim 31 wherein the image exposure period comprises a time period during which pixel polarities vary between on and off states for a range of intensities of the first visible light color.

33. The system of claim 19 wherein the at least one projector comprises a first projector for projecting the user image and wherein the system further comprises a second projector for imperceptibly projecting a second structured light pattern onto a user and tracking motion of the user based on the second structured light pattern.

34. The system of claim 33 comprising a control module for controlling projection of the user image based on the motion of the user.

35. A computer program product comprising computer-executable instructions embodied in a computer-readable medium for performing steps comprising:
   (a) varying pixel intensity values for a first visible light color in a color user image so that pixel polarities encode a first structured light pattern during a selected image exposure period and so that varied pixel intensity values have a predetermined relationship with respect to original pixel intensity values in the user image;
   (b) projecting the user image with the embedded structured light pattern onto a surface; and
   (c) detecting the first structured light pattern during the image exposure period.

36. The computer program product of claim 35 wherein varying the pixel intensity values includes, for each pixel in the first structured light pattern:
   (a) determining whether a polarity of a pixel in the user image encodes a desired value corresponding to a pixel in the first structured light pattern during the selected image exposure period, the pixel in the user image having a first intensity value; and
   (b) in response to determining that the polarity of the pixel in the user image does not encode the desired value, changing the first intensity value to a second intensity value, the second intensity value being the closest intensity value to the first intensity value that encodes the desired value during the image exposure period.

37. The computer program product of claim 36 comprising calculating a difference between the second pixel intensity value and the first pixel intensity value and propagating the difference to pixels adjacent to the pixel in the user image.

38. The computer program product of claim 35 wherein varying pixel intensity values comprises:
(a) compressing a range of intensity values for the first visible light color in the user image to exclude intensities at a beginning and an end of the range for which pixel polarity has a constant value; and
(b) selecting, from the compressed range, the pixel intensity values whose polarities encode the first structured light pattern.

39. The computer program product of claim 38 comprising compressing a range of pixel intensity values for at least one second visible light color in the user image proportionally to the compressing of the range of intensity values for the first visible light color.

40. The computer program product of claim 35 wherein varying pixel intensity values include varying pixel intensity values without modifying a projector used to project the user image.

41. The computer program product of claim 35 comprising:
(a) calculating depth information based on the detected structured light pattern; and
(b) adjusting projection of the user image based on the depth information.

42. The computer program product of claim 41 wherein projecting the user image onto a surface includes projecting the user image onto a non-planar surface and wherein adjusting display of the user image includes pre-distorting the user image such that a projection of the user image on the non-planar surface appears undistorted.

43. The computer program product of claim 35 wherein projecting the user image includes projecting an interface generated by a computer software application.

44. The computer program product of claim 35 wherein projecting the user image comprises projecting the user image using a single projector and wherein detecting the first structured light pattern includes detecting the first structured light pattern using a single camera.

45. The computer program product of claim 35 wherein projecting the user image includes projecting portions of the user image using a plurality of projectors and wherein detecting the first structured light pattern includes detecting the first structured light pattern using a plurality of cameras.

46. The computer program product of claim 45 wherein projecting portions of the user image using a plurality of projectors includes projecting a first portion of the user image including the first structured light pattern and projecting a second portion of the user image that overlaps with the first portion of the user image in a manner that does not interfere with detection of the first structured light pattern during the selected image exposure period.

47. The computer program product of claim 46 wherein projecting a first portion of the user image including a first structured light pattern includes encoding the first structured light pattern using different intensities of the first visible light color and wherein projecting the second portion of the user image in a manner that does not interfere with detection of the first structured light pattern includes varying intensities of the first visible light color in the second portion to encode a common value during the selected image exposure period.

48. The computer program product of claim 35 comprising selecting the image exposure period based on analysis of pixel polarities.

49. The computer program product of claim 48 wherein selecting the image exposure period includes analyzing mirror flip sequences of a projector used to project the user image for different intensities of the first visible light color.

50. The computer program product of claim 48 wherein selecting the image. exposure period includes selecting a time during which pixel polarities vary between on and off states for a range of intensities of the first visible light color.

51. The computer program product of claim 35 comprising imperceptibly projecting a second structured light pattern and tracking motion of a user based on the second structured light pattern.

52. The computer program product of claim 51 comprising controlling projection of the user image based on the motion of the user.

* * * * *